United States Patent
Pleshachkov et al.

(10) Patent No.: US 10,417,132 B1
(45) Date of Patent: Sep. 17, 2019

(54) SYSTEM AND METHOD TO RESOLVE LIBRARY PATH IN THE DISTRIBUTED CLUSTER ENVIRONMENT

(71) Applicant: EMC IP Holding Company LLC, Hopkinton, MA (US)

(72) Inventors: Petr Olegovich Pleshachkov, Nootdorp (NL); Valery Maltsev, Delft (NL); Ewout Graswinckel, Nootdorp (NL)

(73) Assignee: EMC IP Holding Company LLC, Hopkinton, MA (US)

( * ) Notice: Subject to any disclaimer, the term of this patent is extended or adjusted under 35 U.S.C. 154(b) by 243 days.

(21) Appl. No.: 15/281,398

(22) Filed: Sep. 30, 2016

(51) Int. Cl.
*G06F 12/00* (2006.01)
*G06F 12/0875* (2016.01)
*G06F 3/06* (2006.01)

(52) U.S. Cl.
CPC ........ *G06F 12/0875* (2013.01); *G06F 3/0686* (2013.01); *G06F 2212/60* (2013.01)

(58) Field of Classification Search
None
See application file for complete search history.

(56) References Cited

U.S. PATENT DOCUMENTS

| 9,830,345 B1* | 11/2017 | Baars | G06F 11/1451 |
| 2010/0093383 A1* | 4/2010 | Kim | G01C 21/26 |
| | | | 455/500 |
| 2018/0061401 A1* | 3/2018 | Sarikaya | G10L 15/22 |

OTHER PUBLICATIONS

Louie, David "xDB 10.0: Introduction to Multi-node", http://www.community.emc.com/docs/DOC-7462, Jun. 22, 2010 (4 pages).

* cited by examiner

*Primary Examiner* — Midys Rojas
(74) *Attorney, Agent, or Firm* — Chamberlain, Hrdlicka, White, Williams & Aughtry

(57) ABSTRACT

In general, embodiments of the technology relate to method for resolving a library path in a distributed system. The method includes receiving a path resolution request, issuing a first request to a first node server to obtain a first library name index (LNI) associated with a first portion of the library path, obtaining the first LNI, and generating, based on the first LNI, a second request to a second node server of the plurality of node servers, where the second request is associated with a second portion of the library path. The method further includes after not receiving a second response to the second request: issuing a request message to a set of node servers, receiving, from one of the node servers, a third response to the request message, and resolving the entire library path using, at least in part, the third response.

12 Claims, 21 Drawing Sheets

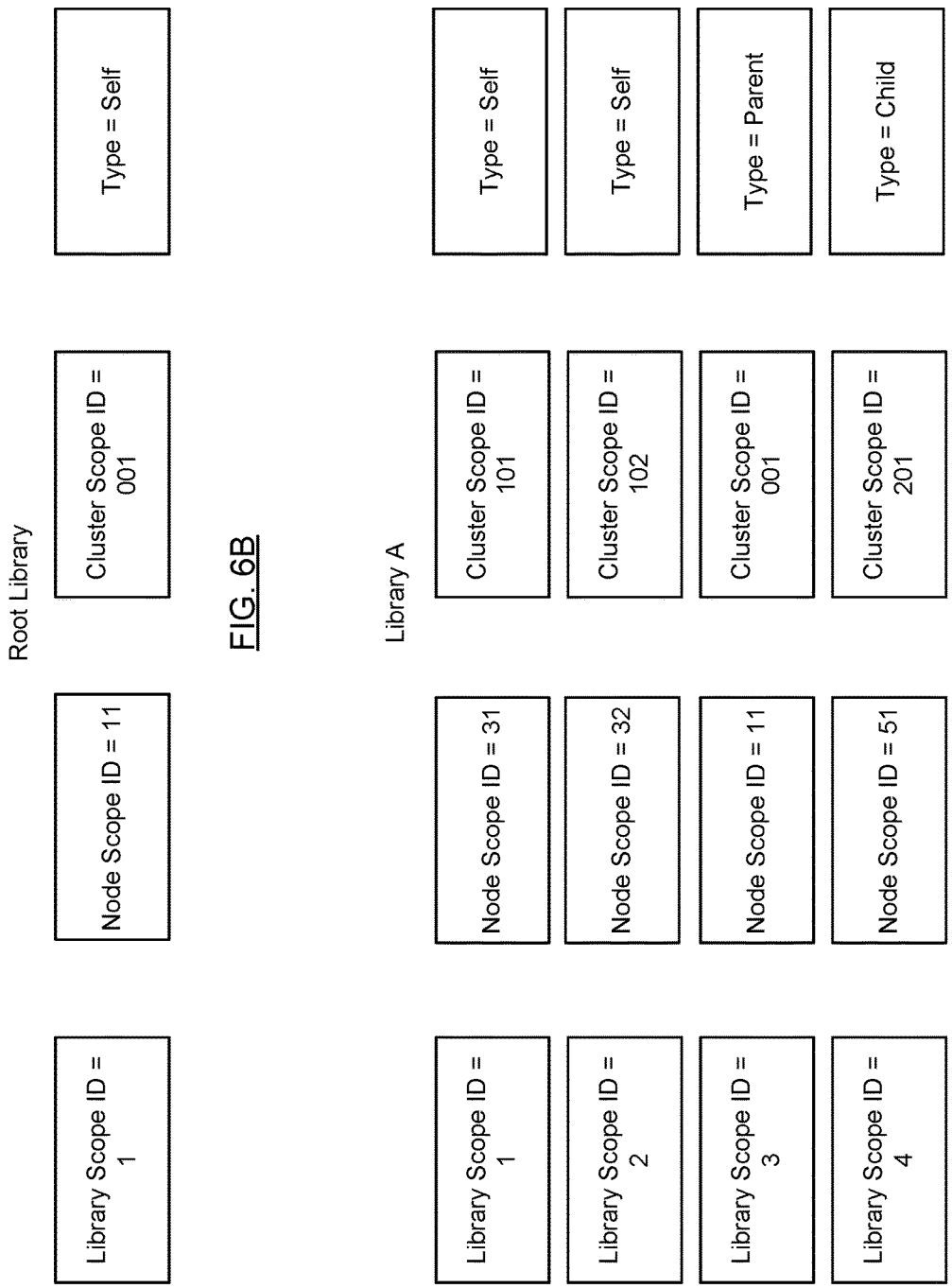

Library B

| Library Scope ID | Node Scope ID | Cluster Scope ID | Type |
|---|---|---|---|
| 1 | 51 | 201 | Self |
| 2 | 52 | 202 | Self |
| 3 | 31 | 101 | Parent |
| 4 | 71 | 301 | Child |
| 5 | 81 | 401 | Child |

FIG. 6D

Local Path Index Entry

Library Name Index Entry

Client Cache Entry

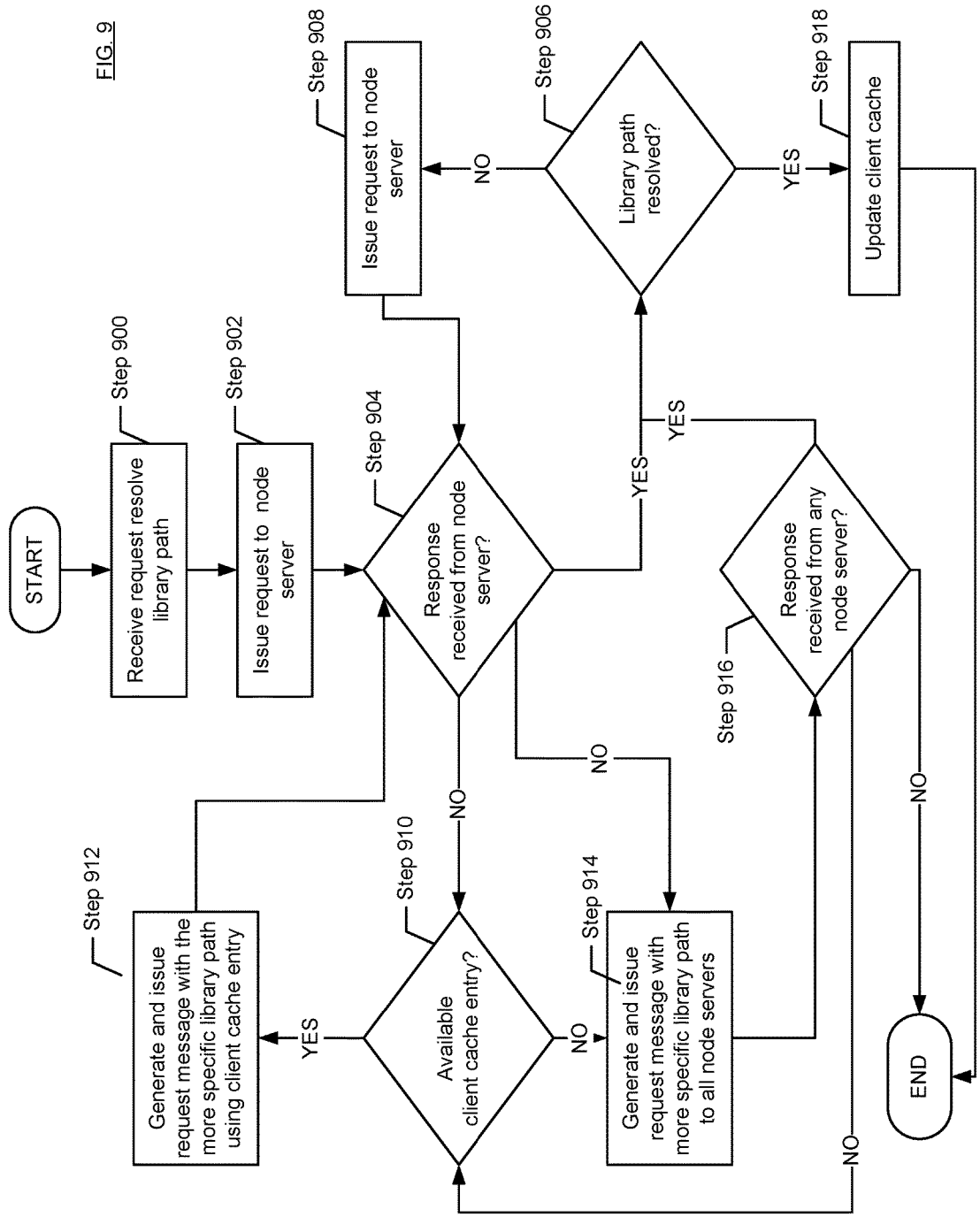

SYSTEM AND METHOD TO RESOLVE LIBRARY PATH IN THE DISTRIBUTED CLUSTER ENVIRONMENT

BACKGROUND

Content may be stored in persistent storage and accessed by a content management system. In certain implementations, the content management system may store the content in a distributed manner across multiple nodes. If one or more nodes become unavailable, content may not be accessible from the content management system.

BRIEF DESCRIPTION OF DRAWINGS

FIGS. 5A-6B show flowcharts for processing requests in accordance with one or more embodiments of the technology.

FIGS. 6A-6J shows an example in accordance with one or more embodiments of the technology.

FIG. 9 shows a flowchart for library path resolution in accordance with one or more embodiments of the technology.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1A-10, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to resolving library paths in a cluster environment in accordance with one or more embodiments of the technology. More specifically, FIGS. 7A-9 show a system and method for resolving a library path in accordance with one or more embodiments of the technology. The method for resolving library paths may be performed within the cluster environment as described in FIGS. 1A-6J. However, those skilled in the art will appreciate that the library path resolution may be implemented in other cluster environments without departing from the technology.

Figure 1A:
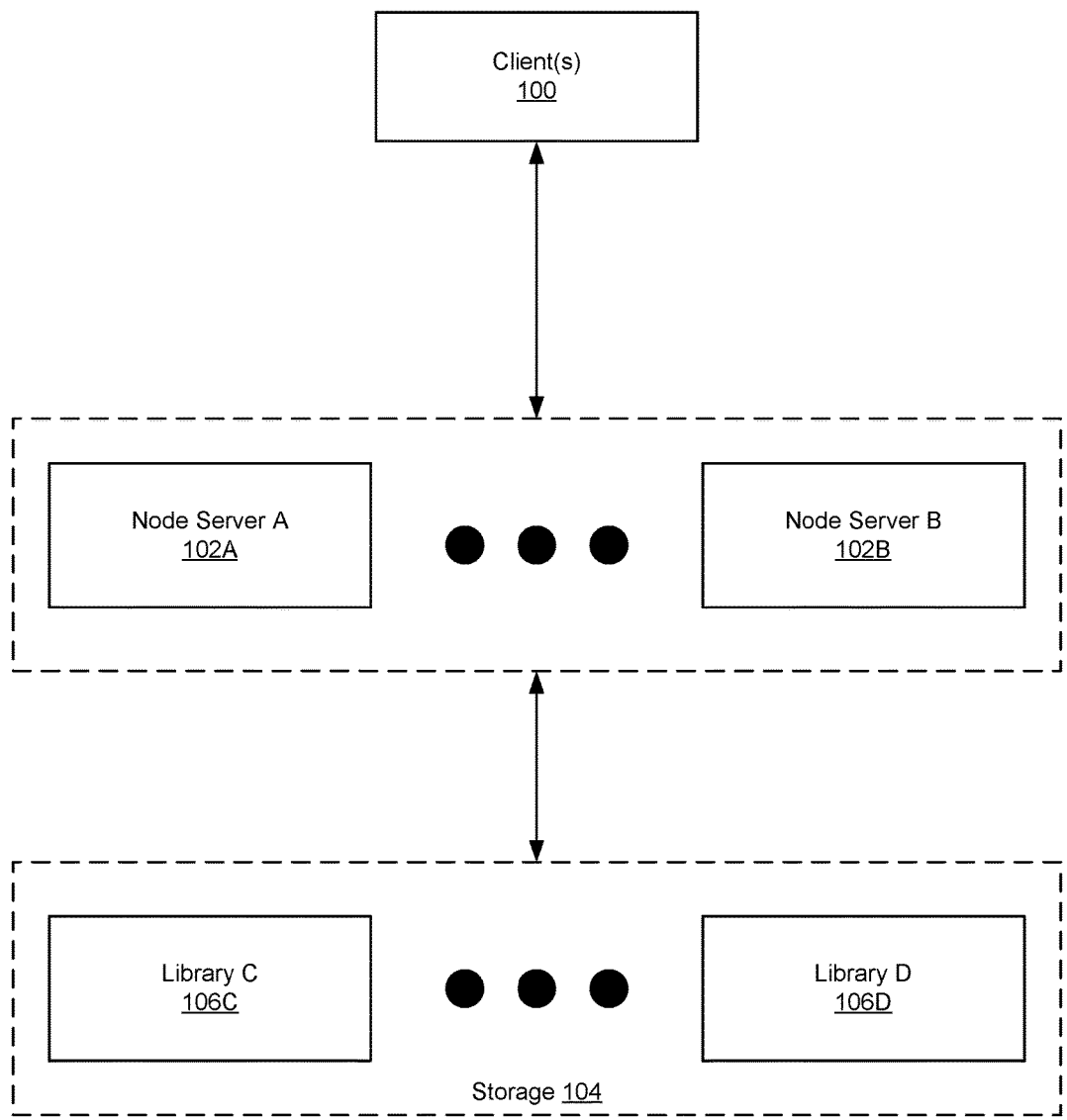
FIG. 1A shows an exemplary system in accordance with one or more embodiments of the technology.

Turning to FIG. 1A, FIG. 1A shows an exemplary system in accordance with one or more embodiments of the technology. The system includes one or more client systems (100), one or more node servers (102A, 102B), and a storage (104) with one or more libraries (106C, 106D). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 10) that includes functionality to issue requests (also referred to as queries) to the node servers (102A, 102B) and to receive a corresponding response(s) from the node servers after the request has been serviced.

Continuing with the discussion of FIG. 1A, the node servers include functionality to perform all or a portion of the methods shown in FIGS. 3-9. The node servers may also include functionality to perform various actions (e.g., read, write, delete, modify, send, etc.) on the files stored in the libraries when servicing requests from the client systems (see e.g., FIGS. 3-9). The node servers may provide database management services, such as detaching a library from a database and reattaching the library to another database.

Figure 10:
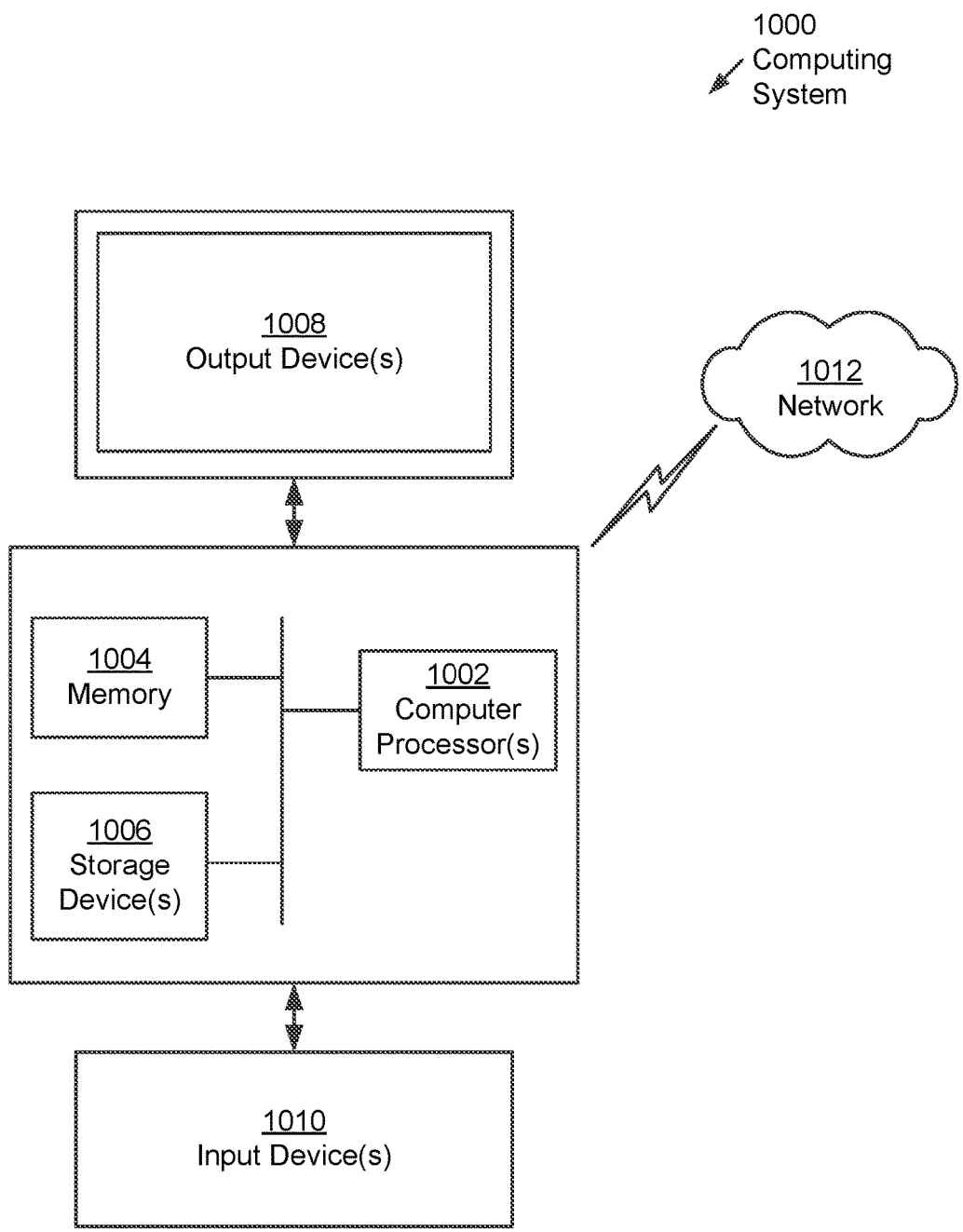
FIG. 10 shows a computing system in accordance with one or more embodiments of the technology.

Each node server (102A, 102B) may be implemented using one or more computing systems (see e.g., FIG. 10). Additional detail about the operation of the node servers is provided in FIGS. 2A, 2D and 3-9.

In one embodiment of the technology, the storage (104) includes persistent storage (e.g., solid state storage, magnetic storage, optical storage, any other type of persistent storage or any combination thereof) in which libraries are stored.

Continuing with the discussion of the storage, the storage may store libraries (106C, 106D) using any known or subsequently discovered mechanism. The following describes various examples of the mechanisms that may be used to store libraries. The examples are not intended to limit the technology. In a first example, the storage (104) may be a set of magnetic hard disks. In a second example, the storage (104) may be implemented using a computer cluster that is executing a distributed file system. In a third example, the storage (104) may be implemented using a network file server and one or more block-storage devices (i.e., as a Storage Area Network).

Each library (106C, 106D) may include one or more data files (see e.g., FIG. 2B, FIG. 2C) and is accessible via one or more nodes. The data files may be eXtensible Markup Language (XML) files. Data files in other file formats may be used without departing from the technology. Each data file may include references (also referred to as library scope pointers) to other data files in the library and/or references to other data files in other libraries. Those skilled in the art will appreciate that the data files may be stored in the storage in a binary format or any other format supported by the storage media. Additional detail about the data files is described below in FIG. 2C.

In one embodiment of the technology, each library (106C 106D) is bound to a single node server (i.e., is accessible via the node server), while each node server may be bound to multiple libraries. If there are multiple node servers bound to different libraries all associated with the same database instance, then the set of node servers may be referred to as a cluster.

In one embodiment of the technology, the system shown in FIG. 1A is a shared-nothing distributed system. In such embodiments, each node server may only access its own storage. For example, consider a scenario in which the system includes two node servers (e.g., node server 1, node server 2) and four separate storage devices (e.g., storage device 1, storage device 2, storage device 3, and storage device 4). Further, assume that storage devices 1 and 2 are attached to node server 1 and storage devices 3 and 4 are only attached to node server 2. In this scenario, node server 1 may only access the data stored on storage devices 1 and 2 and node server 2 may only access the data on storage devices 3 and 4.

Figure 1B:
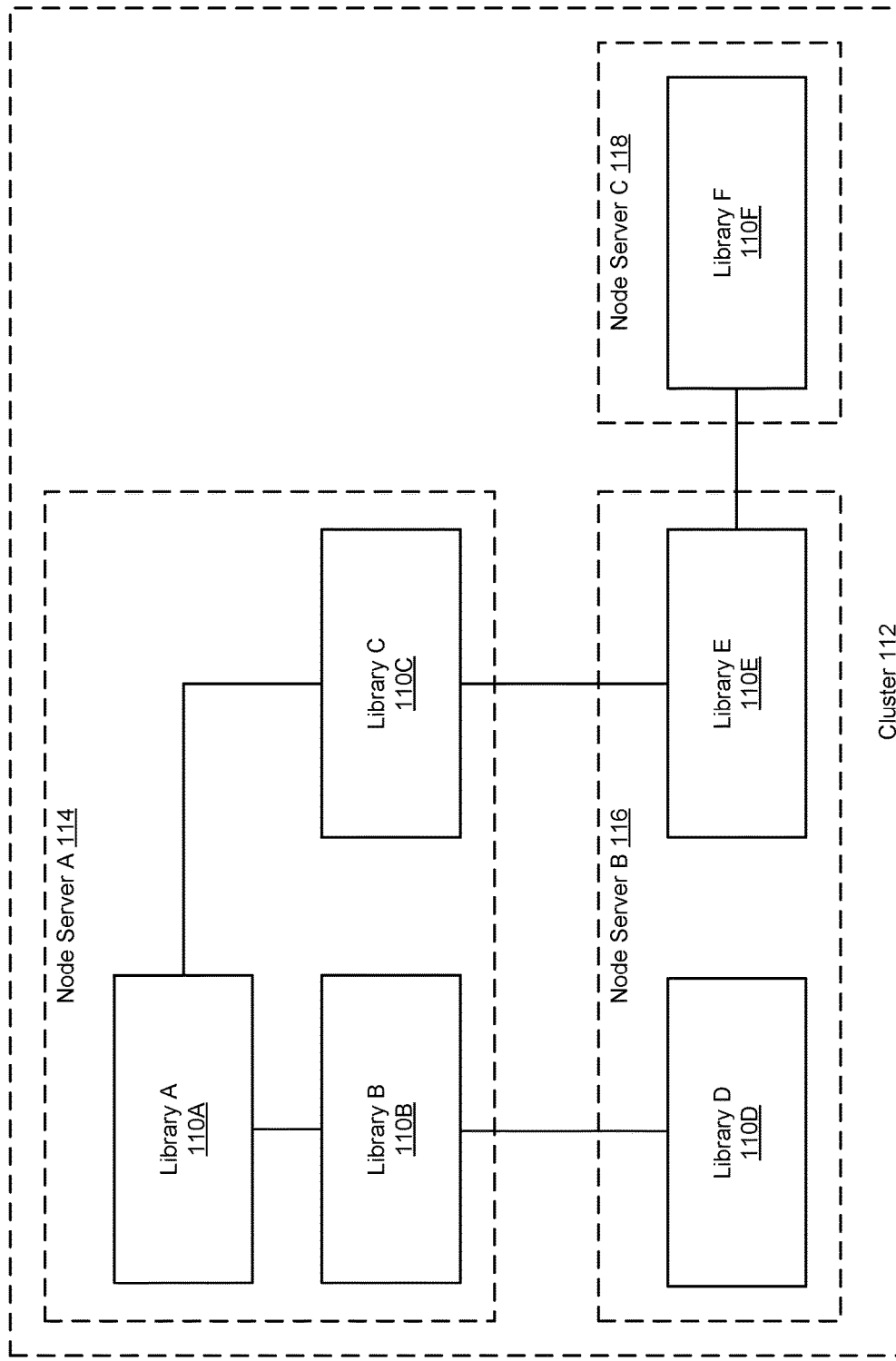
FIG. 1B shows an exemplary cluster in accordance with one or more embodiments of the technology.

FIG. 1B shows an exemplary cluster in accordance with one or more embodiments of the technology. As shown in FIG. 1B, the cluster (112) includes three nodes (114, 116, 118). Node Server A (114) is bound to three libraries (110A, 110B, 110C) arranged in a hierarchical manner, where Library A (110A) is the root Library and Library B (110B) and Library C (110C) are its child libraries. Further, node server B (116) is bound to Library D (110D), which is a child library of Library B (110B), and Library E (110E), which is a child library of Library C (110C). Finally, node server C (118) is bound to Library F (110F), which is a child library of Library E (110E). In one embodiment of the technology, a first library may be designated as a child library of second library if there is a least one pointer (or reference) from a data file in the first library to the second library (or vice versa). In the above example, Libraries A-F are considered to be within the cluster.

The technology is not limited to the architecture of the system shown in FIGS. 1A-1B.

Figure 2A:
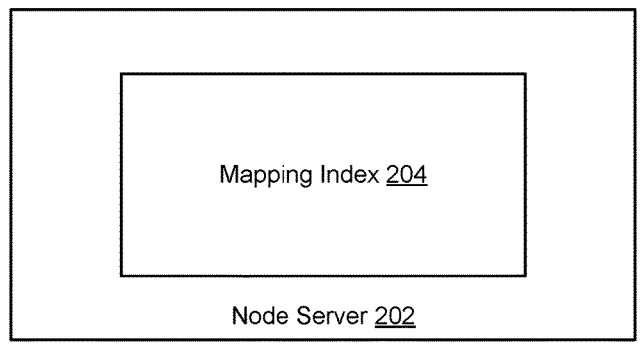
FIGS. 2A-2D show various relationships between components in accordance with one or more embodiments of the technology.

FIGS. 2A-2D show various relationships between components in accordance with one or more embodiments of the technology. Turning to FIG. 2A, in one embodiment of the technology, each node server (200) includes a mapping index (204) which keeps track of the mappings between a library scope ID, a node scope ID, and a cluster scope ID (see e.g., FIG. 2D). The node server may only maintain a mapping index for the libraries to which it is attached. Said another way, the node server may not include a mapping index that covers all data files in all libraries that are attached to any node server in the system; rather, a given node server may only include a mapping index with entries for data files in libraries that it accesses (or is able to access).

In one embodiment of the technology, the library scope ID is assigned to each data file in a library. The library scope ID for a given data file does not change over time (regardless to which database it is attached). Further, the library scope ID uniquely identifies the data file within the library; however, the library scope ID may not be a globally unique ID. Said another way, other data files in other libraries may have the same library scope ID. In one embodiment of the technology, a node scope ID is assigned to a data file by a particular node server (see e.g., FIGS. 3-4). The node scope ID for a given data file in a library may change each time it is attached to a different database. The node scope ID is only unique within the node server (202). Accordingly, the node scope ID may be reused by other node servers that are part of the same cluster.

Figure 3:
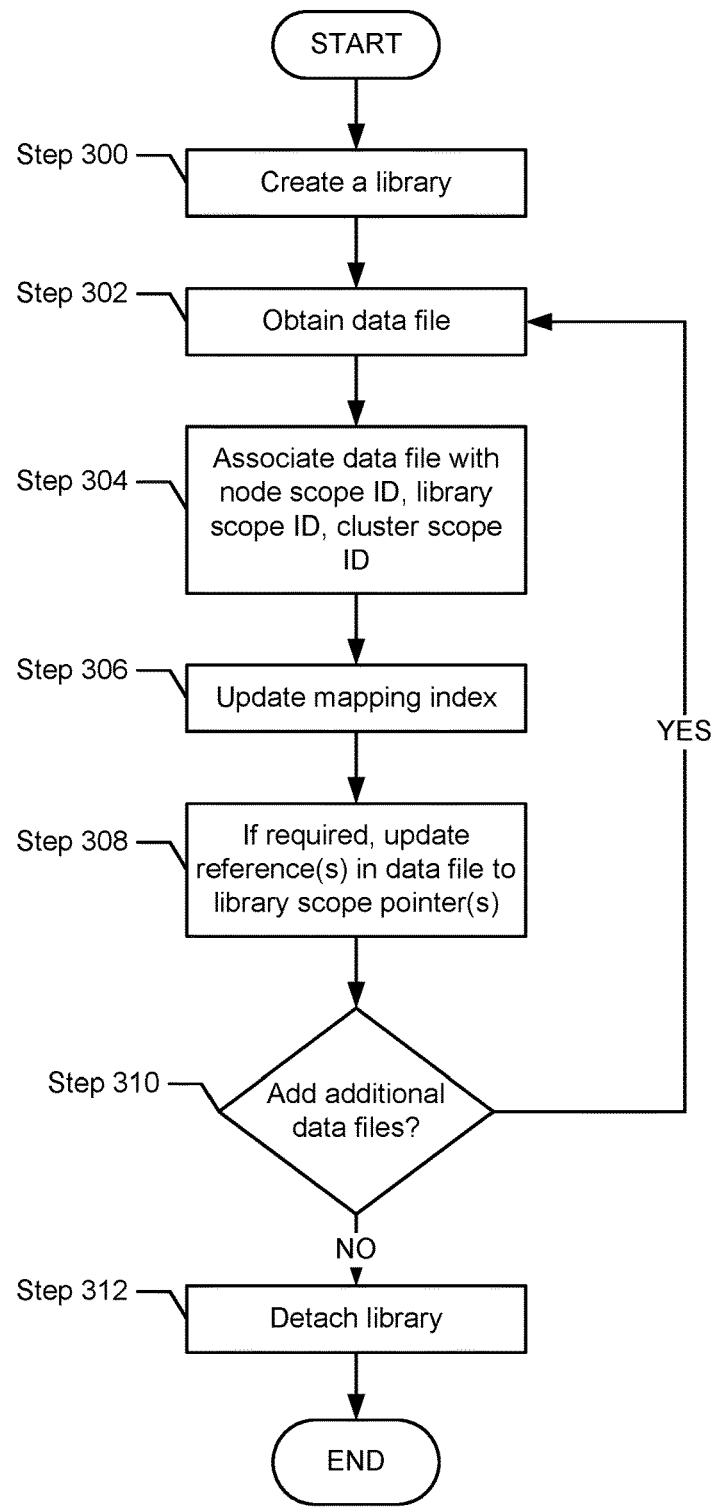
FIG. 3 shows a flowchart for creating a library in accordance with one or more embodiments of the technology.
Figure 4:
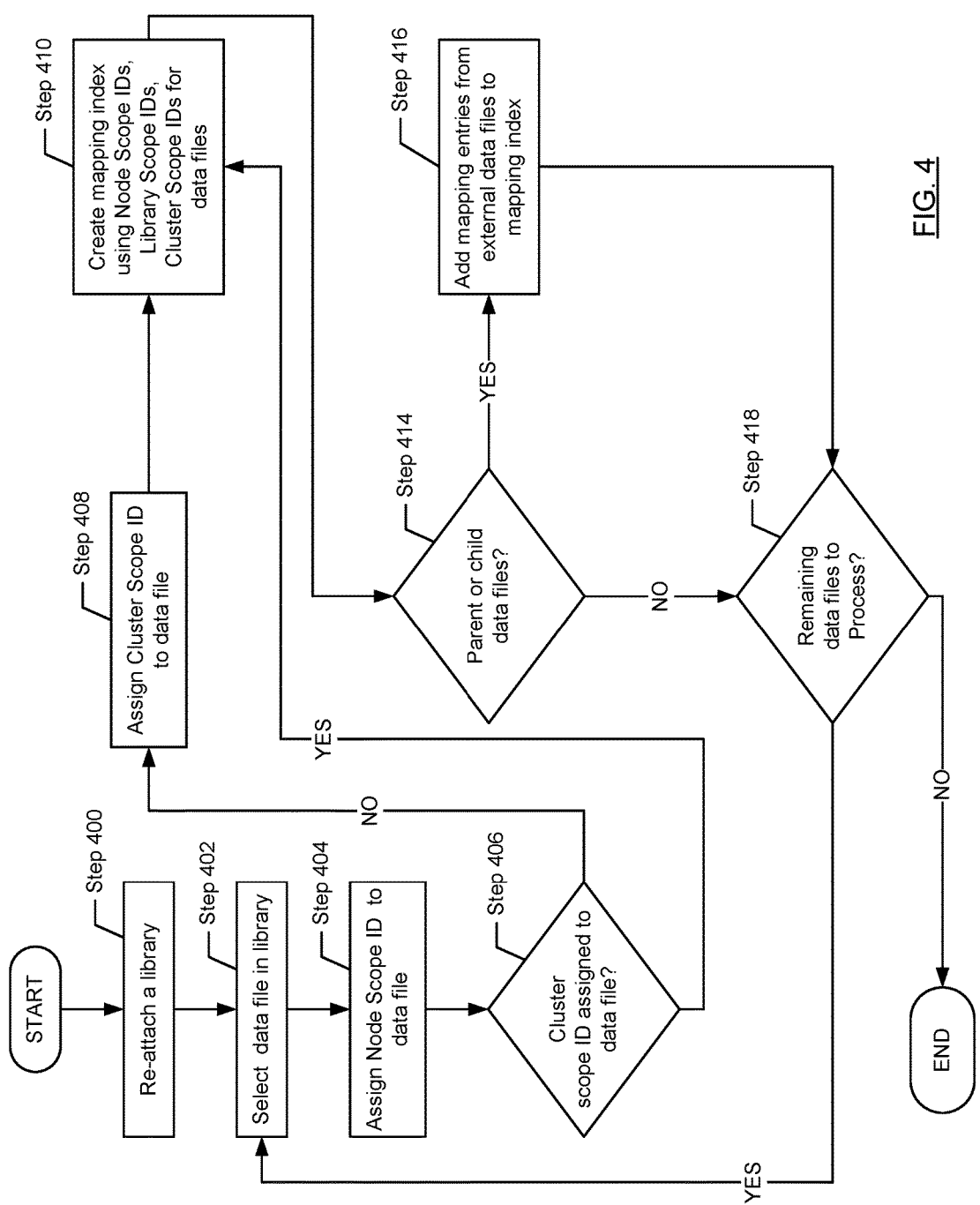
FIG. 4 shows a flowchart for reattaching a detached library in accordance with one or more embodiments of the technology.

In one embodiment of the technology, a cluster scope ID is assigned to a data file by a particular database (or database instance) (see e.g., FIGS. 3-4). The cluster scope ID for a given data file in a library may change each time it is attached to a different cluster; however, the cluster scope ID is unique across all libraries in the cluster.

Figure 2B:
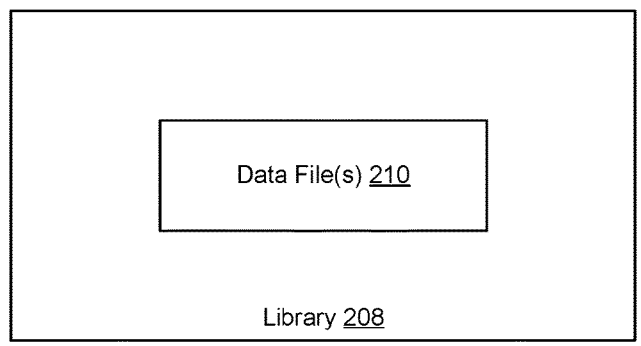
Figure 2C:
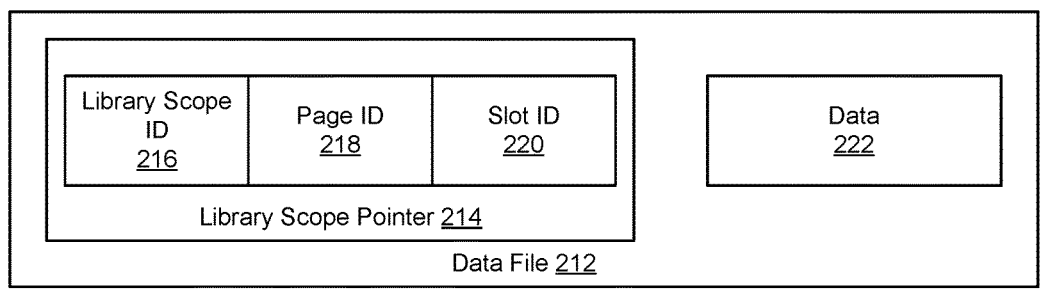

Referring to FIG. 2B, in one embodiment of the technology, each library (208) includes one or more data files (210) and each data file is assigned a library scope ID, the node scope ID, and a cluster scope ID. As discussed above, a data file may reference one or more other data files. The data file uses a library scope pointer to reference other data files. Additional detail about the contents of a data file is shown in FIG. 2C. In one embodiment of the technology, different libraries may assign their own library scope ID to the same underlying data file. Accordingly, a single data file may be associated with multiple library scope IDs.

Referring to FIG. 2C, in one embodiment of the technology, a data file may include one or more library scope pointers (214) and data (222). Each library scope pointer (214) includes three fields: a library scope ID (216) (described above), a page ID (218) and a slot ID (220). The page ID (when multiplied by page size) denotes an offset within a data file and the slot ID denotes a sequence of bytes within that page starting at the offset. In other words, any required data from the data file can be located by the pointer in the form of <library scope ID+page ID+slot ID>.

By using library scope pointers in the library, all references within the library are self-contained and, as such, the library may be readily detached and reattached to a new database while preserving the references within the library. Said another way, because the references in the library are self-contained, the references do not need to be updated when the library is subsequently reattached to another database.

In one embodiment of the technology, the data (222) may correspond to any type of data including text, images, multimedia content, indexes (see e.g., FIG. 6J, 9A-9B), or any combination thereof.

Figure 2D:
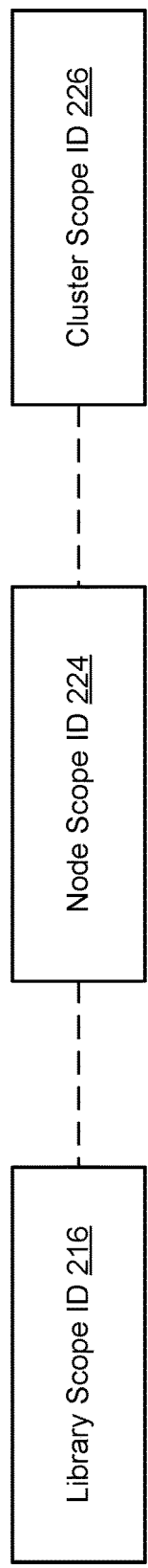

Referring to FIG. 2D, the mapping index (204) includes mapping index entries (MIEs), where each of the MIEs associates the following three IDs: library scope ID (216), node scope ID (224), and cluster scope ID (226). Initially, when a library is attached to a database, the data files in the library are processed (see e.g., FIG. 4) in order to generate the mapping index. The node server may maintain one mapping index per attached library. Alternatively, the node server may maintain a single mapping index, where the node server tracks which mapping index entry is associated with a particular attached library. In addition, though not shown in FIG. 2D, each mapping index entry may be associated with a type. Additional detail about types is provided below.

FIGS. 3-5B show flowcharts in accordance with one or more embodiments of the technology. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 3 shows a flowchart for creating and subsequently detaching a library in accordance with one or more embodiments of the technology. FIG. 3 may be performed by a node server.

In step 300, a library is created. The creation of library may include specifying a library name and/or path. At the time the library is initially created, the library may not have any data files.

In step 302, at some point after the creation of the library, a data file is obtained.

In step 304, the data file is associated with a node scope ID, a library scope ID, and a cluster scope ID. The node scope ID is assigned based on the database instance of which this library is a part, the cluster scope ID is assigned based on the cluster of which this node server is a part, and the library scope ID is assigned by the node server (or another process). The node scope ID, the cluster scope ID, and the library scope ID may be assigned using any known or later developed mechanism that ensures no ID collisions. Further, the node scope ID, cluster scope ID, and the library scope ID may include letters, numbers, symbols, or any combination thereof.

In step 306, the mapping index is updated to include the mapping between the library scope ID, the cluster scope ID, and the node scope ID for this data file.

In one embodiment of the technology, step 308 may be performed. Specifically, if the data file that is being added to the library includes a reference(s) that is not a library scope pointer(s), then in step 308, the reference(s) is replaced with a library scope pointer(s). However, if all references in the data file are library scope pointers or the data file does not include any references, then step 308 is not performed. In one embodiment of the technology, if step 308 is performed, it is performed by the node server prior to the data file being stored on the persistent storage.

In step 310, a determination is made about whether there are any additional data files to be added to the library. If there are additional libraries to be added, the process proceeds to step 302; otherwise the process ends. Those skilled in the art will appreciate that steps 302-310 may be repeated for other data files at other points time.

At some later point in time, in step 312, the library is detached. Detaching a library may include physically moving the library to new/different persistent storage. Once a library is detached, it is no longer accessible to any node server until it is subsequently re-attached. The detachable library may be part of a hierarchy of libraries (see e.g., FIGS. 1B, 6A). In such cases, detaching the library includes detaching the library and the corresponding child libraries. For example, with reference to FIG. 1B, detaching Library B may also include detaching Library D.

FIG. 4 shows a flowchart for reattaching a detached library in accordance with one or more embodiments of the technology. The method shown in FIG. 4 may be performed by a node server.

In step 400, a library is reattached to a database. It may be reattached to the same database from which it was detached or to a different database. In one embodiment of the technology, the database may be implemented using one or more node servers. The reattachment of the library is step 400 may correspond to the binding of the library to a node server. Once a library is bound to a node server, the data files within the library may be accessed via the node server.

In step 402, a data file in the library is selected.

In step 404, a new node scope ID is assigned to the data file in the library. In one embodiment of the technology, the new node scope ID is assigned by the node server to which the library is attached. However, as discussed above, the library scope IDs associated with the data files in the library remain the same.

In step 406, a determination is made about whether the data file is already associated with a cluster scope ID. The following example describes a scenario in which the data file may have been previously assigned a cluster scope ID. Turning to the example, consider a scenario in which the library is initially created or attached to a first node server in the cluster. When the library is initially attached to the first node server, the data file in the library is assigned a node scope ID and a cluster scope ID. At some later point in time, the library is detached and moved to a second node server in the cluster. When the library is reattached, the data file in the library is assigned a new node scope ID but retains the previously assigned cluster scope ID as the second node server is within the same cluster as the first node server. Returning to FIG. 4, if the data file is already associated with a cluster scope ID, the process proceeds to step 410; otherwise the process proceeds to step 408.

In step 408, a cluster scope ID is assigned to the data file.

In step 410, a mapping index entry is created (or updated) using the node scope ID, the cluster scope ID, and the library scope ID associated with the selected data file. The mapping index entry created in step 410 may be associated with a type of self.

In step 414, a determination is made about whether the data file includes a reference to a data file that is in a different library (located on the same node server or a different node server within the cluster). For example, referring to FIG. 6A, a data file in Lib B may include a reference to a data file in Lib A. In this scenario, the data file in Lib A is a parent of the data file in Lib B (also referred to as a parent data file). Similarly, a data file in Lib B may reference a data file in Lib C. In this scenario, the data file in Lib C is a child of the data file in Lib B (also referred to as a child data file). Accordingly, the mapping index created (or updated) in step 404 may also include a mapping index entry for each of the parent data files and each of the child data files.

Continuing with the discussion of FIG. 4, if the data file (i.e., the data file selected in step 402) includes an external reference and/or is referenced by a data file in a different library, then the process proceeds to step 416; otherwise, the process proceeds to step 418.

In step 416, one or more mapping index entries are adding to the mapping index, where each of the mapping index entries corresponds to a data file in a library that is different than the library in which the data file (i.e., the data file selected in step 402) is stored. Each mapping index entry generated in step 416 corresponds to a data file and may be associated with one of the following types: (i) parent—if the data file is located on the same node as the selected data file (i.e., the data file selected in step 402) and is a parent data file of the selected data file; (ii) child—if the data file is located on the same node as the selected data file (i.e., the data file selected in step 402) and is a child data file of the selected data file; (iii) parent cluster—if the data file is located on a different node than the selected data file (i.e., the data file selected in step 402) and is a parent data file of the selected data file; and (iv) child cluster—if the data file is located on a different node than the selected data file (i.e., the data file selected in step 402) and is a child data file of the selected data file. In one embodiment of the technology, if the type of the mapping index entry is either child cluster or parent cluster, then the mapping index entry does not include a node scope ID (see e.g., FIGS. 6H, 6I)

In step 418, a determination is made about whether there are any additional data files to process in the library. If there are additional data files to process, the method proceeds to step 402; otherwise, the method ends.

Figure 5A:
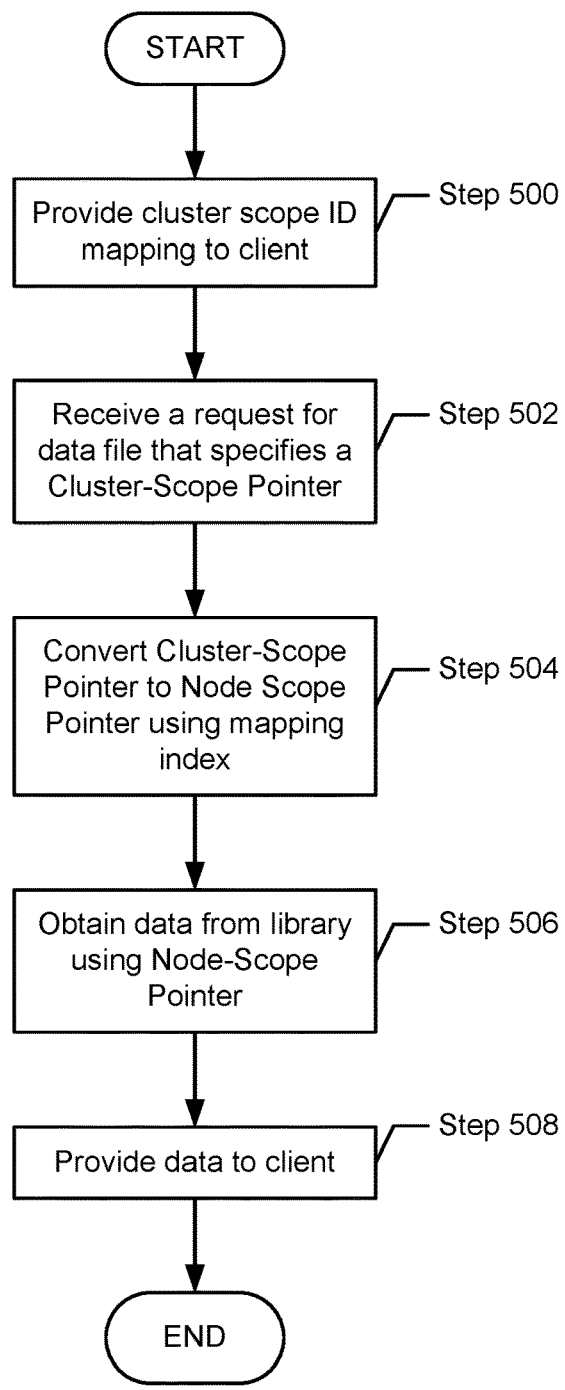

FIG. 5A shows a flowchart for processing a request in accordance with one or more embodiments of the technology. FIG. 5A is from the perspective of a node server.

In step 500, a cluster scope ID mapping is provided to a client. In one embodiment of the technology, the cluster scope ID mapping is the mapping between cluster scope IDs and library scope IDs. The cluster scope ID mapping may be derived and/or generated using the aforementioned mapping index. Prior to the client sending the request in step 502, the client obtains the cluster scope ID mapping from a node server. In one embodiment of the technology, the cluster scope ID mapping includes an entry for each data file that is accessible via the node server. Accordingly, the cluster scope ID mapping includes entries for all data files that are stored in a library that is accessible by the node server as well as entries for any parent and/or child data files for any of the data files stored in a library that is accessible by the node server. In one embodiment of the technology, the cluster scope ID mapping may be updated as the libraries are attached to the cluster, detached from the cluster, and/or moved between node servers in the cluster. In one embodiment of the technology, the client may include multiple cluster scope ID mappings. Further, the client may track the node server from which each cluster scope ID mapping was obtained.

In step 502, a request for data (while may be the entire data file or part of data file) which specifies a cluster scope ID pointer is received from a client (i.e., a pointer such as the one shown in FIG. 2C, except the pointer includes a cluster scope ID instead of a library scope ID).

The following is an example of how the client (or a driver on the client) may issue a request to the node server. Initially, the client may obtain a library scope pointer from a data file (e.g., a data file previously obtained from a library in the cluster). The library scope pointer is subsequently converted to a cluster scope pointer using the cluster scope ID mapping, which maps library scope IDs to cluster scope IDs. A request that includes the generated cluster scope pointer is then issued to the node server. In one embodiment of the technology, the node server that receives the request corresponds to the node server that provided the data file from which the library scope pointer was obtained. In one embodiment of the technology, the client includes an application and a client driver. In this scenario, the application may issue queries to the node server, where the query is specified using any known or later discovered query language. The query is subsequently received by the client driver. The client driver may then convert the query in to one or more requests, where the request includes cluster scope pointers (and/or cluster scope IDs). In this scenario, the application is not aware of any of the IDs that are used by the node server or any of the attached libraries.

Continuing with the discussion of FIG. 5A, in step 504, the cluster scope pointer is converted to node scope pointer using the mapping index. As discussed above, when a library is attached to a node server, the node server assigns each data file in the library a node scope ID. The node scope ID enables the node server to access the data file in the attached library. Continuing with the discussion of FIG. 5A, the cluster scope pointer is in the form of <cluster scope ID+page ID+slot ID>. By using the mapping index, the cluster scope ID is converted to node scope ID. Then the node scope pointer is obtained in the form of <node scope ID+page ID+slot ID>.

In certain scenarios, the data that is being requested (i.e., the data that is associated with the cluster scope pointer) is not accessible via the node server that received the request in step 502. For example, the data being requested may correspond to a data file that is a parent data file located in a library that is bound to a different node server. For example, referring to FIG. 1B, node server C (118) may receive a cluster scope pointer that is associated with a data file in library E (110E) which is only accessible via node server B (116).

In such instances, the node server which received the request in step 502 may use the cluster scope ID in the request to identify a mapping index entry, where the mapping index entry includes the cluster scope ID and has a type of either parent cluster or child cluster. Upon determining that the type of the mapping index entry is parent cluster or child cluster, the node server may send back information to the client that the requested data file is accessible via a second node server. Upon receipt of this information, the client may reissue the request with the same cluster scope ID to the second node server. The second node server, upon receipt of the request, uses the mapping index located on the second node server to convert the cluster scope ID to the appropriate node scope ID.

In step 506, the requested data is obtained from the library using the node scope pointer. The node scope pointer is the physical data pointer in the database instance. Every single item of data in the library can be located using the physical data pointer (also referred to as node scope pointer). More specifically, the node server uses the node scope pointer to obtain the requested data.

In step 506, the obtained data is provided to the client system that issued the request.

Figure 5B:
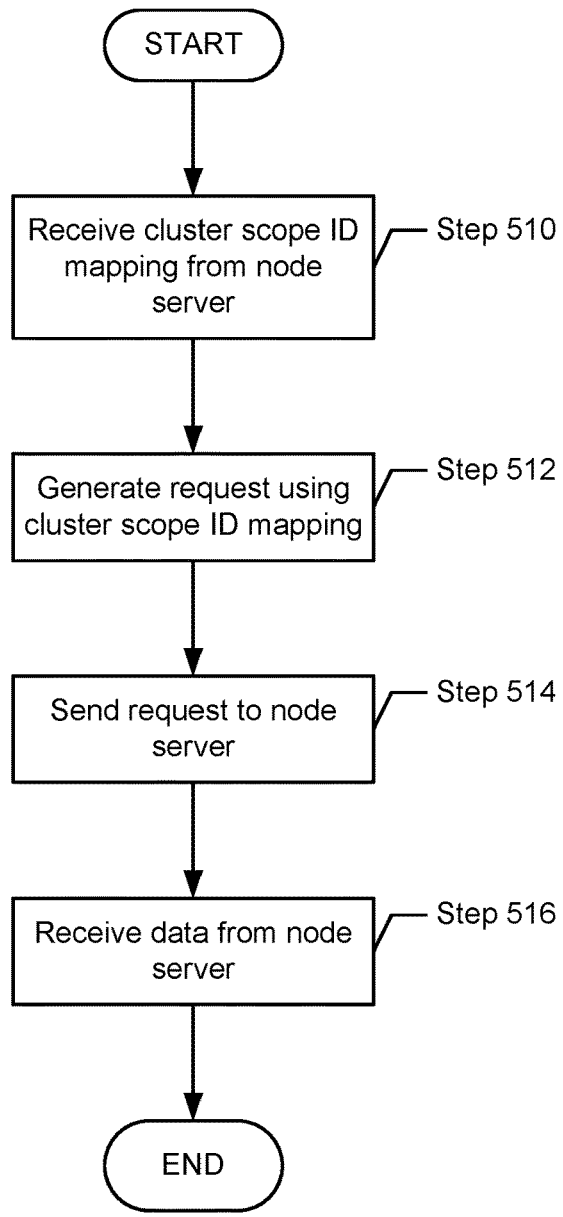

FIG. 5B shows a method for issuing a request to a node server in accordance with one or more embodiments of the technology. FIG. 5B is from the perspective of a client.

In step 510, a cluster scope ID mapping is received from a node server. The cluster scope ID mapping may be received, for example, in response to a request to connect to the node server. The client may maintain information which indicates from which node server the cluster scope ID mapping was received.

In step 512, at some point in time after step 510, the client may generate a request that includes a cluster scope ID. Generating the request may include: (i) obtaining a library scope pointer, (ii) identifying a node server associated with the library scope pointer; (iii) obtaining the cluster scope ID mapping associated with the identified node server; (iv) obtaining, using the cluster scope ID mapping, a cluster scope ID that corresponds to the library scope ID in the library scope pointer; and (v) generating the cluster scope pointer using the cluster scope ID obtained in (iv).

In step 514, the request is issued to a node server. In step 516, the node server subsequently receives the requested data.

The following is a non-limiting example of the method shown in FIG. 5B. The example is not intended to limit the scope of the technology. Turning to the example, referring to FIG. 1B, consider a scenario in which the client received a data file stored on library E (110E) from node server B (116), extracted a library scope pointer from the data file, and converted the library scope pointer to a cluster scope pointer using a cluster scope ID mapping obtained from node server B (116). In this scenario, the request that includes the cluster scope pointer is sent to node server B (116).

In one embodiment of the technology, if the node server that received the request is not able to directly access the requested data (e.g., the requested data is only accessible via a different node server in the cluster), the step 516 may include receiving a reference (or other information) that may be used to re-issue the request (i.e., the request in step 514) to a node server that can access the requested data.

Figure 6A:
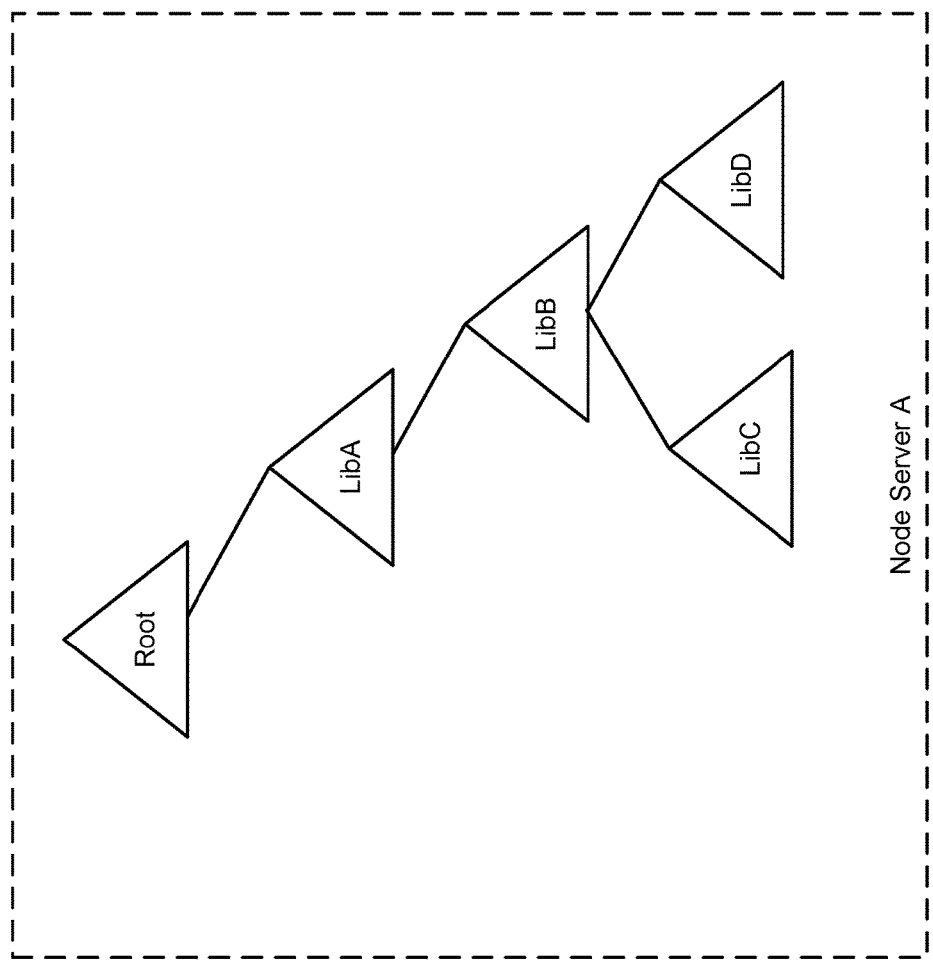
Figure 6E:
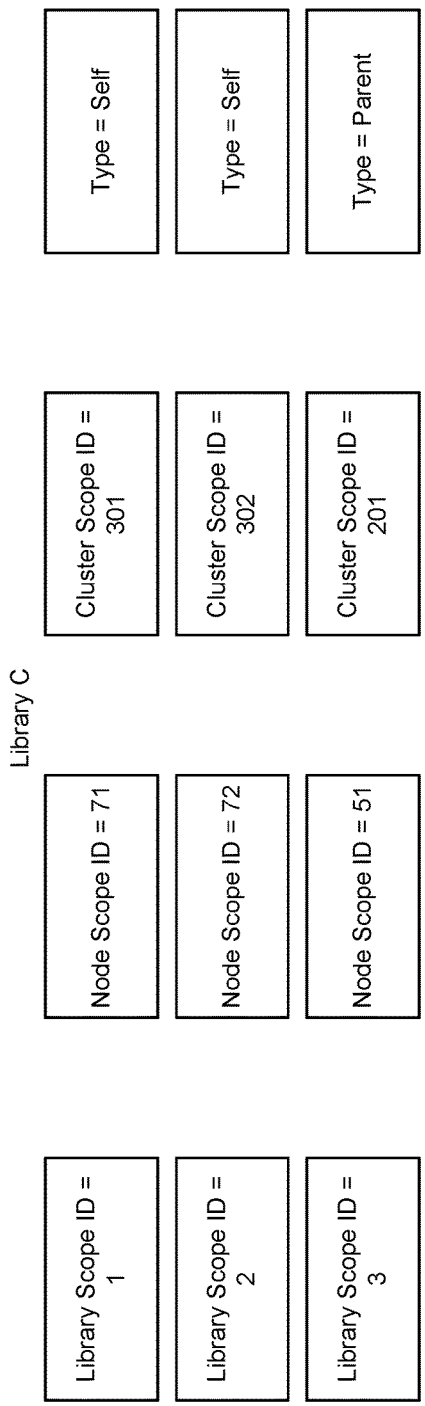
Figure 6F:
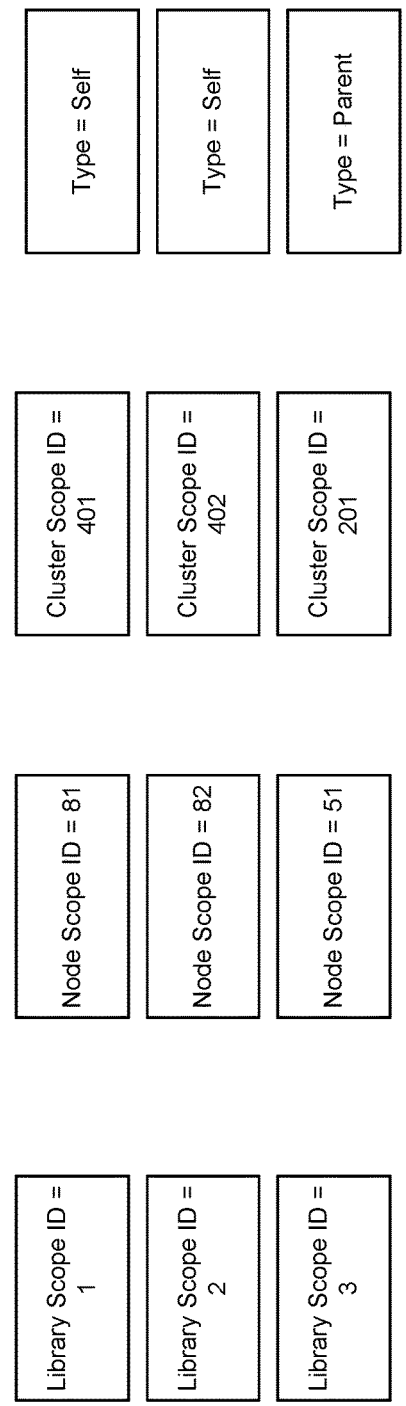
Figure 6G:
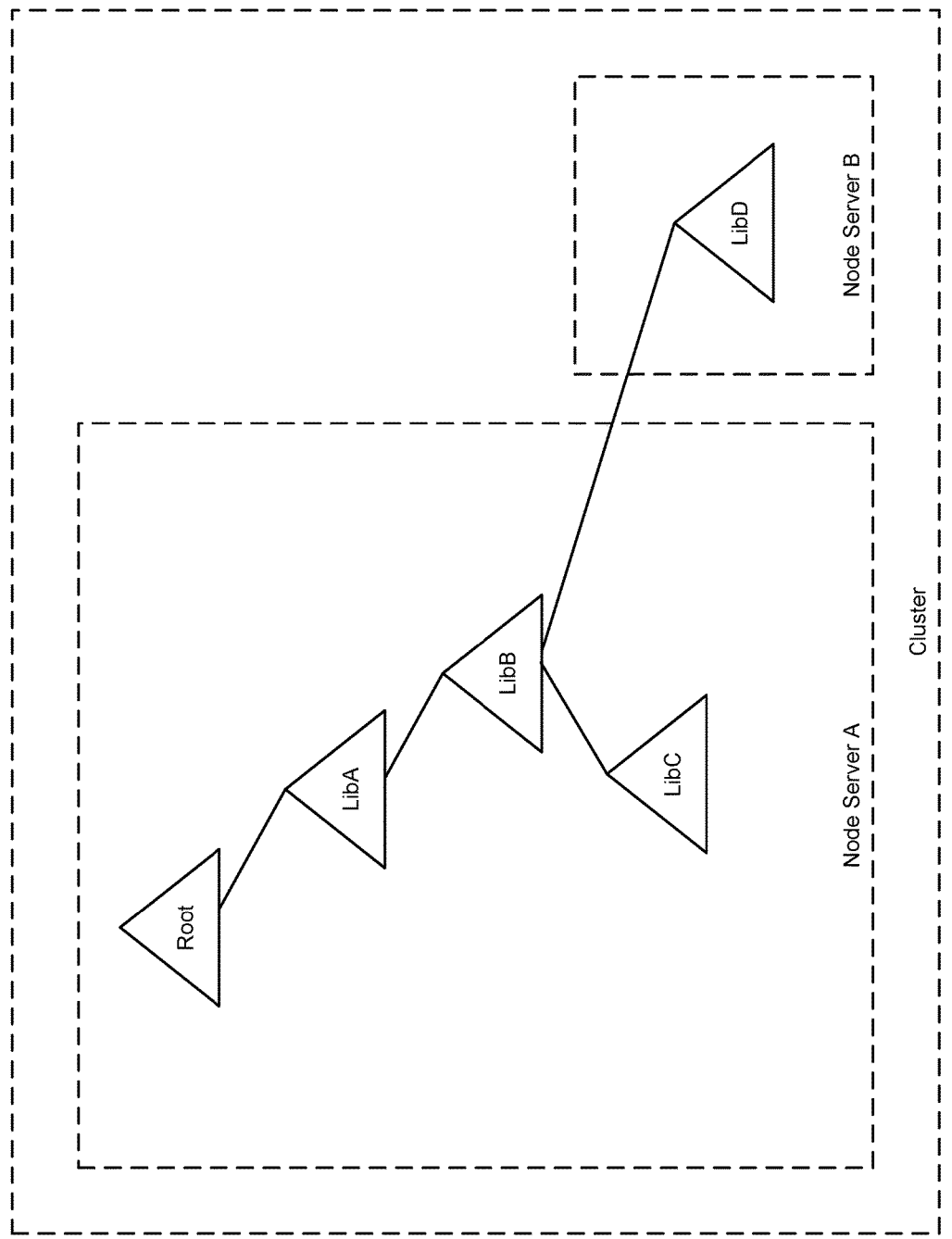
Figure 6H:
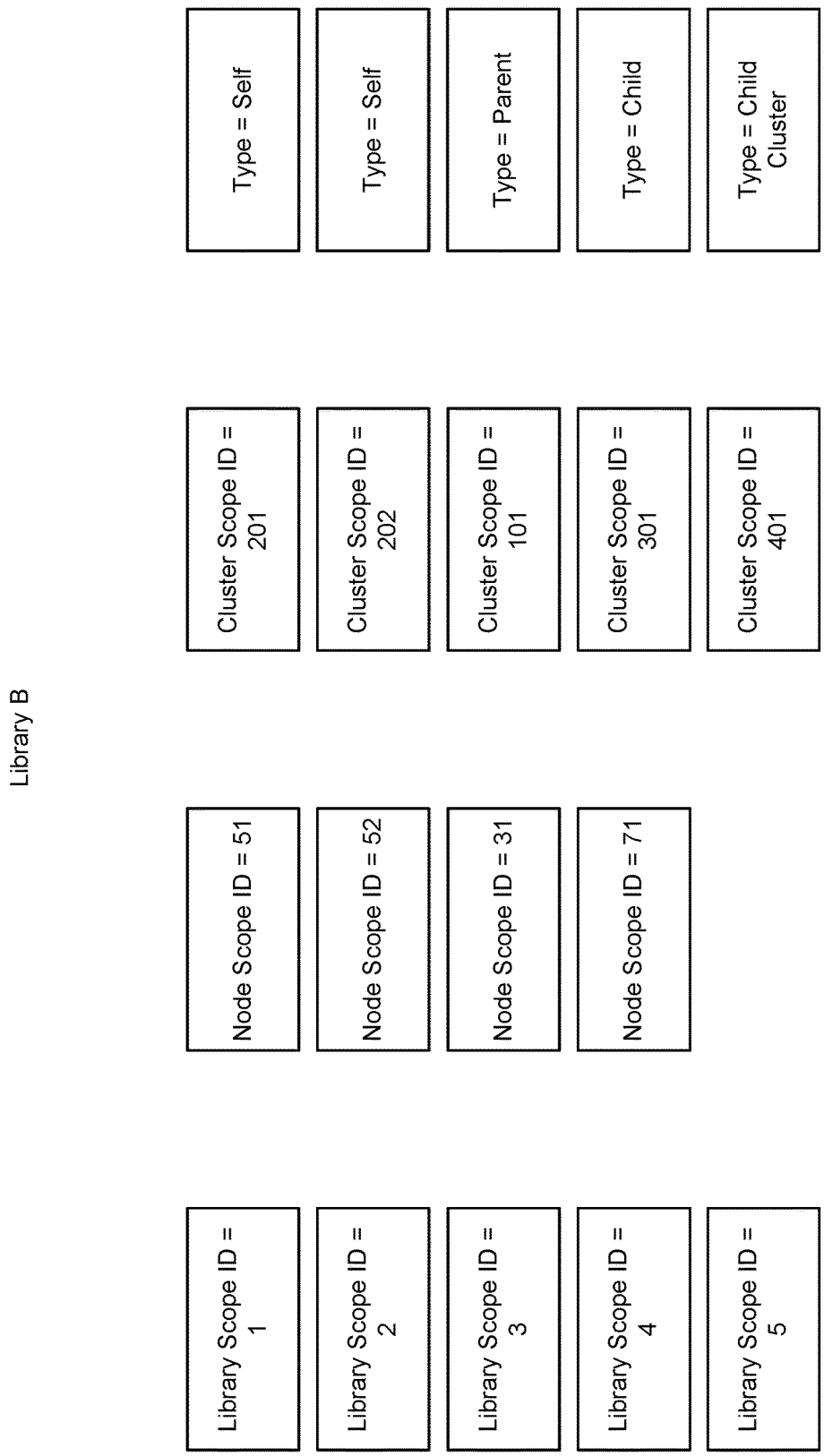
Figure 6I:
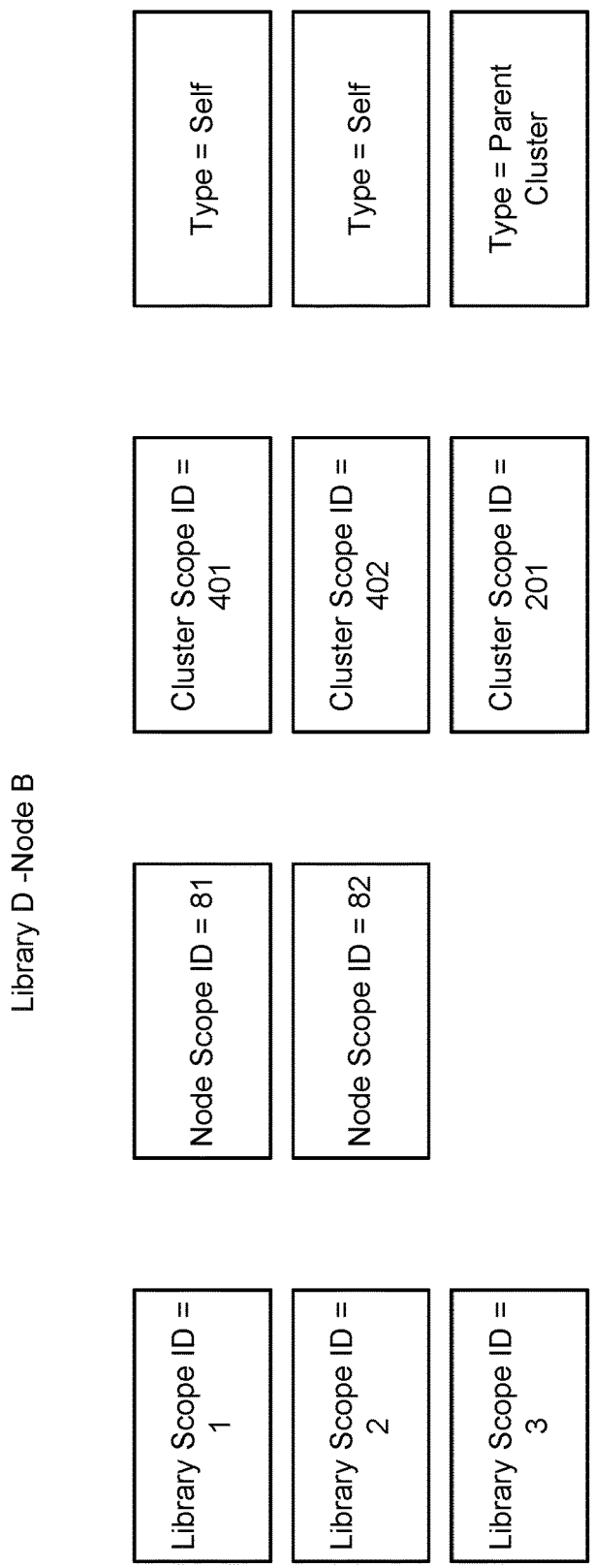
Figure 6J:
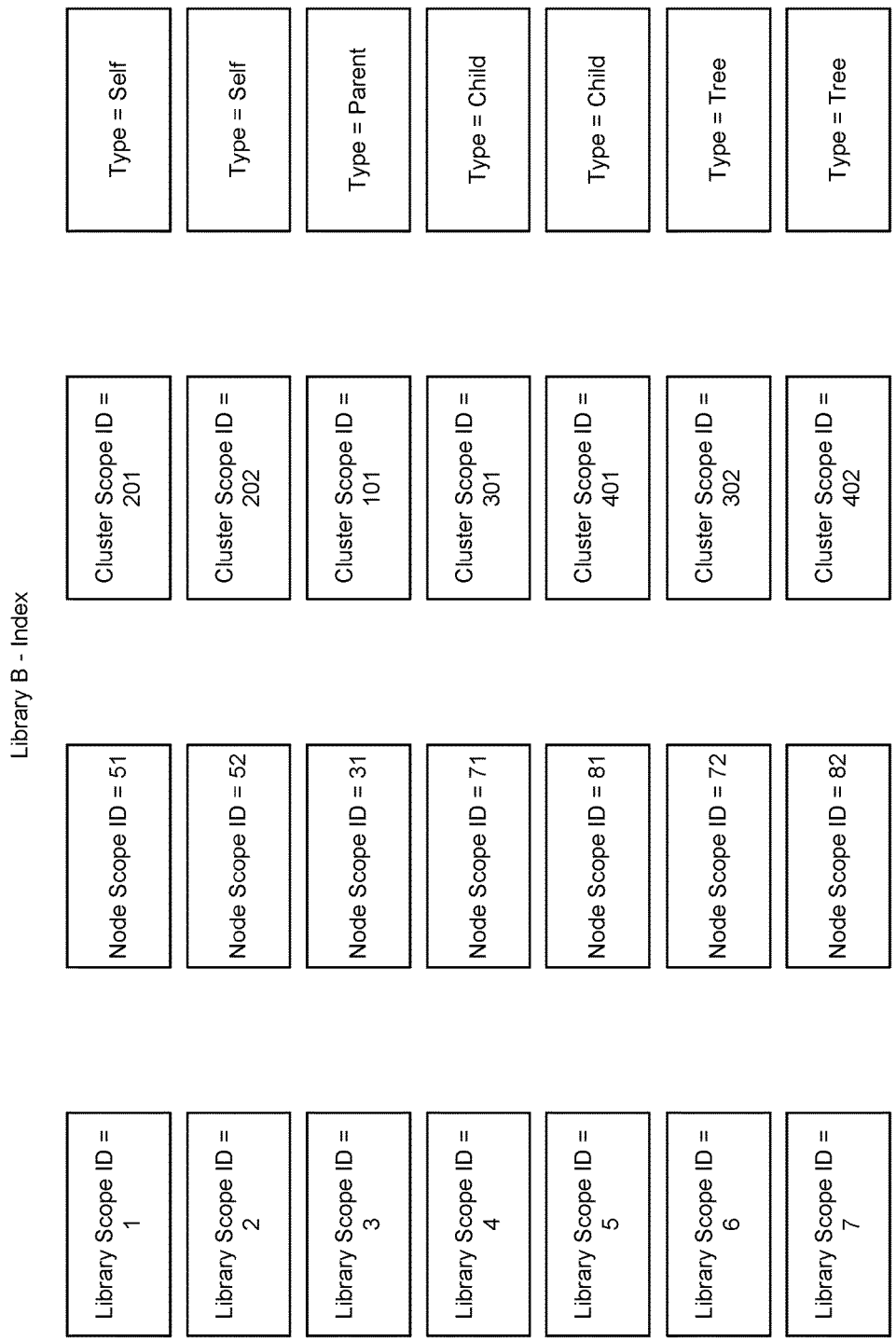

FIGS. 6A and 6J show an example in accordance with one or more embodiments of the technology. The example is not intended to limit the scope of the technology.

FIG. 6A shows the tree hierarchy before a detachable piece is attached. In this example, the root library (denoted as root) has one data file (not shown) with library scope ID of 1, node scope ID of 11, a cluster scope ID of 001, and a type of self. The mapping index of the root library is shown in FIG. 6B.

Continuing with the discussion of FIG. 6A, library A (denoted as Lib A) has two data files (not shown). The first data file is associated with the following IDs: (i) library scope ID=1, (ii) node scope ID=31, (iii) cluster scope ID=101. The second data file is associated with the following IDs: (i) library scope ID=2, (ii) node scope ID=32, (iii) cluster scope ID=102. In addition, the first data file in Library A has a reference to a parent data file, which is the data file located in the root Library. The parent data file, within the context of Library A, is associated with the following IDs: (i) library scope ID=3, (ii) node scope ID=11, (iii) cluster scope ID=001. Because the parent data file is not located in Library A, the parent data file is associated with different library scope ID in the mapping index associated with the Library A as compared to the mapping index associated with the same data file in the root Library (i.e., the mapping index shown in FIG. 6C). For example, in the mapping index in the root Library, the data file is associated with library scope ID=1, while the data file (which is denoted as parent data file to the first data file in Library A) is associated with library scope ID=3 in the mapping index associated with Library A. Finally, the first data file in Library A has a reference to a child data file in Library B. Accordingly, the IDs associated with the child data file are: (i) library scope ID=4, (ii) node scope ID=51, (iii) cluster scope ID=201. The mapping index of Library A is shown in FIG. 6B. As shown in FIG. 6C, the mapping index includes four mapping index entries, one entry for each of the data files stored in library A (denoted with type=Self), one entry for the parent data file (denoted by type=parent) and one entry for the child data file (denoted by type=child).

Continuing with the discussion of FIG. 6A, library B (denoted as Lib B) has two data files (not shown). The first data file is associated with the following IDs: (i) library scope ID=1, (ii) node scope ID=51, (iii) cluster scope ID=201. The second data file is associated with the following IDs: (i) library scope ID=2, (ii) node scope ID=52, (iii) cluster scope ID=202. In addition, the first data file in Library B has a reference to a parent data file, which is the first data file located in Library A. The parent data file, within the context of Library A, is associated with the following IDs: (i) library scope ID=3, (ii) node scope ID=31, (iii) cluster scope ID=101. Because the parent data file is not located in Library B, the parent data file is associated with a different library scope ID in the mapping index associated with the Library B as compared to the mapping index associated with the same data file in Library A (i.e., the mapping index shown in FIG. 6C). For example, in the mapping index in Library A, the data file is associated with library scope ID=1, while the data file (which is denoted as parent data file to the first data file in Library B) is associated with library scope ID=3 in the mapping index associated with Library B. Finally, the first data file in Library B has a reference to a child data file in Library C and a reference to a child data file in Library D. Accordingly, the IDs associated with the child data files are as follows: for child data file in Library C, (i) library scope ID=4, (ii) node scope ID=71, (iii) cluster scope ID=301 and for child data file in library D, (i) library scope ID=5, (ii) node scope ID=81, (iii) cluster scope ID=401. The mapping index of Library B is shown in FIG. 6D. As shown in FIG. 6D, the mapping index includes five mapping index entries, one entry for each of the data files stored in library B (denoted with type=Self), one entry for the parent data file (denoted by type=parent) and one entry for each of the child data files (denoted by type=child).

Continuing with the discussion of FIG. 6A, Library C (denoted as Lib C) has two data files (not shown). The first data file is associated with the following IDs: (i) library scope ID=1, (ii) node scope ID=71, (iii) cluster scope ID=301. The second data file is associated with the following IDs: (i) library scope ID=2, (ii) node scope ID=72, (iii) cluster scope ID=302. In addition, the first data file in Library C has a reference to a parent data file, which is the parent data file located in Library B. The parent data file, within the context of Library C, is associated with the following IDs: (i) library scope ID=3, (ii) node scope ID=51, (iii) cluster scope ID=201. Because the parent data file is not located in Library C, the parent data file is associated with a different library scope ID in the mapping index associated with the Library C as compared to the mapping index associated with the same data file in Library B (i.e., the mapping index shown in FIG. 6D). For example, in the mapping index in library B, the data file is associated with library scope ID=1, while the data file (which is denoted as parent data file to the first data file in Library C) is associated with library scope ID=3 in the mapping index associated with Library C. The mapping index of Library C is shown in FIG. 6E. As shown in FIG. 6E, the mapping index includes three mapping index entries, one entry for each of the data files stored in Library C (denoted with type=Self) and one entry for the parent data file (denoted by type=parent).

Continuing with the discussion of FIG. 6A, library D (denoted as Lib D) has two data files (not shown). The first data file is associated with the following IDs: (i) library scope ID=1, (ii) node scope ID=81, (iii) cluster scope ID=401. The second data file is associated with the following IDs: (i) library scope ID=2, (ii) node scope ID=82, (iii) cluster scope ID=402. In addition, the first data file in Library C has a reference to a parent data file, which is the parent data file located in Library B. The parent data file, within the context of Library D, is associated with the following IDs: (i) library scope ID=3, (ii) node scope ID=51, (iii) cluster scope ID=201. Because the parent data file is not located in Library D, the parent data file is associated with a different library scope ID in the mapping index associated with the Library D as compared to the mapping index associated with the same data file in Library B (i.e., the mapping index shown in FIG. 6D). For example, in the mapping index in Library B, the data file is associated with library scope ID=1, while the data file (which is denoted as parent data file to the first data file in Library D) is associated with library scope ID=3 in the mapping index associated with Library D. The mapping index of Library D is shown in FIG. 6F. As shown in FIG. 6F, the mapping index includes three mapping index entries, one entry for each of the data files stored in Library D (denoted with type=Self) and one entry for the parent data file (denoted by type=parent).

Referring to FIG. 6G, consider a scenario in which Library D is moved to node server B. As discussed above, the library scope IDs associated with the data files in Library D will not change when Library D is moved to node server B. Further, because node server B is in the same cluster as node server A, the cluster scope IDs associated with the data files in Library D will also not change; however, the node scope IDs associated with the data files will change. FIG. 6H shows the resulting mapping index entries for Library B after Library D is moved to node server B and FIG. 6I shows the resulting mapping index entries for Library D after it is moved (or reattached attached) to node server B.

Referring to FIG. 6H, the only mapping index entry that changes when Library D is moved is the mapping index entry corresponding to the data file on Library D. In this example, the mapping index entry with a library scope ID=5 is updated to remove the node scope ID and to indicate that the type of entry has changed from child to child cluster. As discussed above, this indicates that the data file corresponding to this mapping index entry is located in library that is stored on a different node server than Library B.

Referring to FIG. 6I, once Library D is stored on node server B, a mapping index is created. The resulting mapping index is shown in FIG. 6I. The mapping index includes one entry for each of the data files (not shown) that is stored in Library D. These entries include the same library scope IDs and cluster scope IDs that were present in the mapping index for Library D prior to it being moved to node server B; however, the data files are assigned new node scope IDs because they are now associated with a new node server. Finally, the mapping index includes an entry corresponding to the parent data file located in Library B. The mapping index entry for the parent data file includes the same library scope ID and cluster scope ID that was present in the mapping index entry for the parent data file prior to Library D being moved to node server B however, the entry corresponding to the parent data file does not include a node scope ID because the data file corresponding this entry is not accessible via Node Server B. Further, the type associated with this entry is parent cluster, which indicates that the parent data file corresponding to this mapping index entry is located on a library that is accessible via a different node server than Library D.

Referring to FIG. 6J, in one embodiment of the technology, a mapping index may be stored in its associated library. In such cases, the stored mapping index (also referred to as a stored index) includes the same content as the mapping index maintained by the node server. The stored index may also include entries for all referenced data files that are in any library which is a descendant of the library in which the stored index is being stored. For example, referring to FIG. 6J, the stored index corresponds to the stored index for Library B. The stored index includes entries corresponding to the five mapping index entries shown in FIG. 6D. In addition, the stored index includes entries for all other data files that are present in any descendant library. In this example, two additional entries are included. These entries are denoted with type tree. In one embodiment of the technology because a given data file in a library may reference a descendent data file that is in a descendent library (e.g., in a great grandchild library), the index includes entries for all data files in all descendent libraries of the library in order to enable resolution of any library scope pointer for a descendent data file.

As discussed above, embodiments of the technology relate to enabling library path resolution within a distributed cluster environment (such as the one shown in FIGS. 1A-6J) above. More specifically, embodiments of the technology enable the client to determine which node server is able to access a given library within the cluster. For example, the library path resolution, as described below, enables the client to determine which node server is able to access Library D, where the client is only aware of the following library path to Library D: /A/B/C/D. In this example, the first instance of "/" corresponds to the root library and all other libraries are identified by a character, e.g., A, B, C, D. Further, in this example, the libraries are organized in a hierarchy such that Library A is a child library of the root Library, Library B is a child library of Library A, Library C is a child library of Library B, and Library D is a child library of Library C.

In order for a client to issue requests (see e.g., FIG. 5) for data files in Library D, the client must first determine to which node server to issue such a request. As discussed above, because the requests issued by the client identify data files (or portions thereof) using cluster scope pointers and the node servers access the data files from libraries using node scope pointers, the node server that receives the request must include the appropriate mappings to be able to convert the cluster scope ID to node scope ID. The node server that includes the appropriate mapping is the node server that is able to access the library. Said another, the node server with the appropriate mapping is the node server to which the library is bound (see e.g., FIG. 4). The library path resolution system and method as described below in FIGS. 7A-9 provides a mechanism by which a client may be able to identify (i.e., resolve) a node server based on a library path of a specific library. Once this library path resolution is complete, the client may then issue requests for data files within the specified library directly to the identified node server (see e.g., FIG. 5). The path resolution system and method may be used in scenarios in which one or more mode node servers are unavailable.

The following section describes the library path resolution system and method in accordance with one or more embodiments of the technology.

In one embodiment of the technology, two indices are utilized to enable efficient library path resolution. The two indices are the local path index (LPI) and the library name index (LNI). The LPI is maintained on a per-node server basis. Said another way, each node server may include its own LPI; however, the node server may not include an LPI in certain scenarios. Further, in one embodiment of the technology, each LPI only includes LPI entries for libraries that meet the following two criteria: (i) the library is bound to the node server on which the LPI is associated and (ii) the library has a parent library that is bound to a different node server. If a library on the node server meets the above criteria, an LPI entry is created for the library. In scenarios in which the library includes more than one parent library bound to a different node server, the LPI includes one entry associated with each of its parent libraries. Additional detail about the LPI entries is provided in FIG. 8A. In one embodiment of the technology, each library is associated with its own LNI. The LNI for a given library includes an entry for each of its child libraries (if the library is associated with any child libraries). Additional detail about the LNI entries is provided in FIG. 8B.

The contents of the LNI and LPI may be updated when there are changes to the libraries which are associated with the cluster. For example, the LNI and/or LPI may change when libraries are attached and/or detached from the cluster. Further, the LPI and/or the LNI may change when libraries are moved between node servers in the cluster.

Figure 7A:
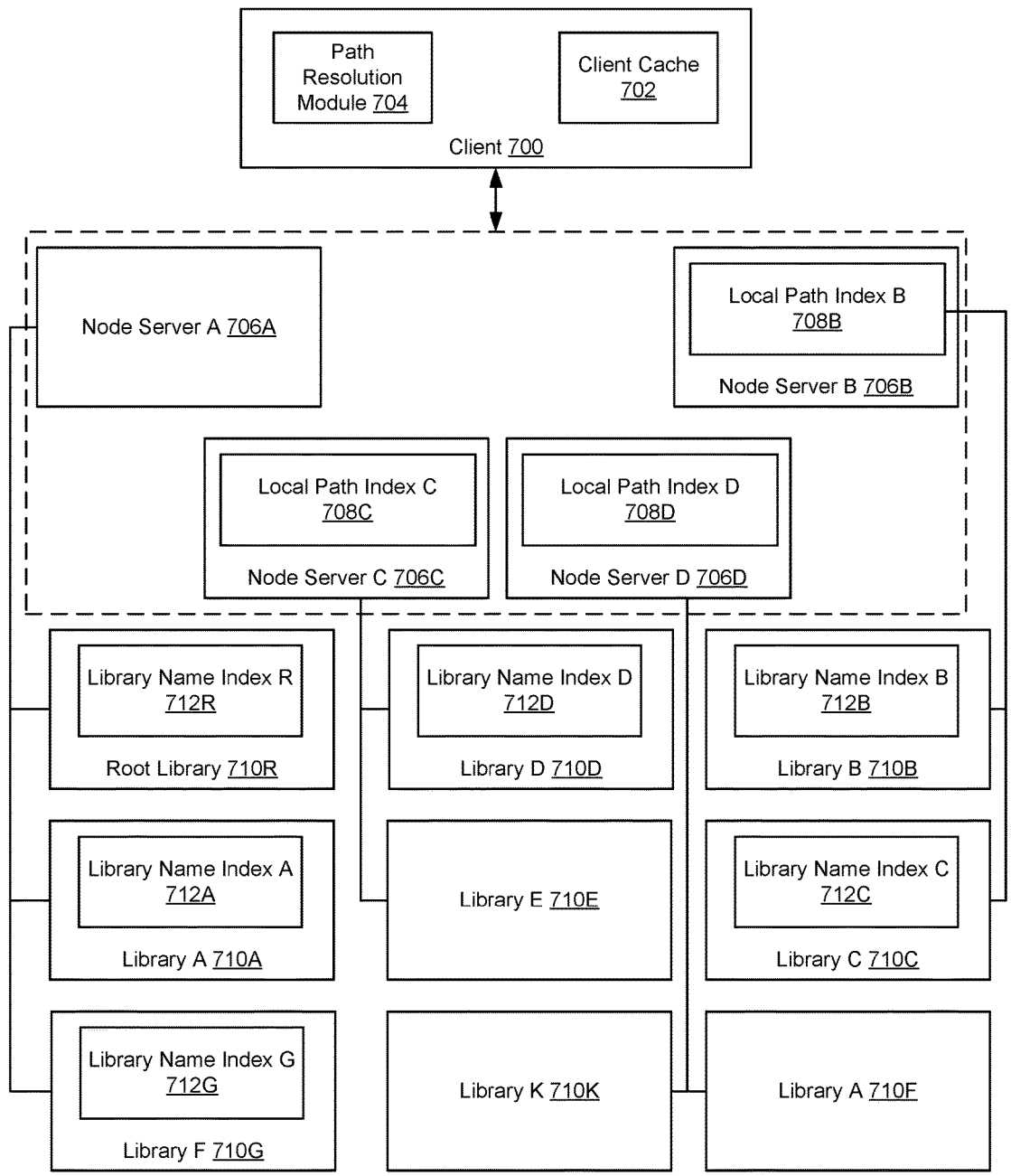
FIG. 7A shows an exemplary system in accordance with one or more embodiments of the technology.
Figure 7B:
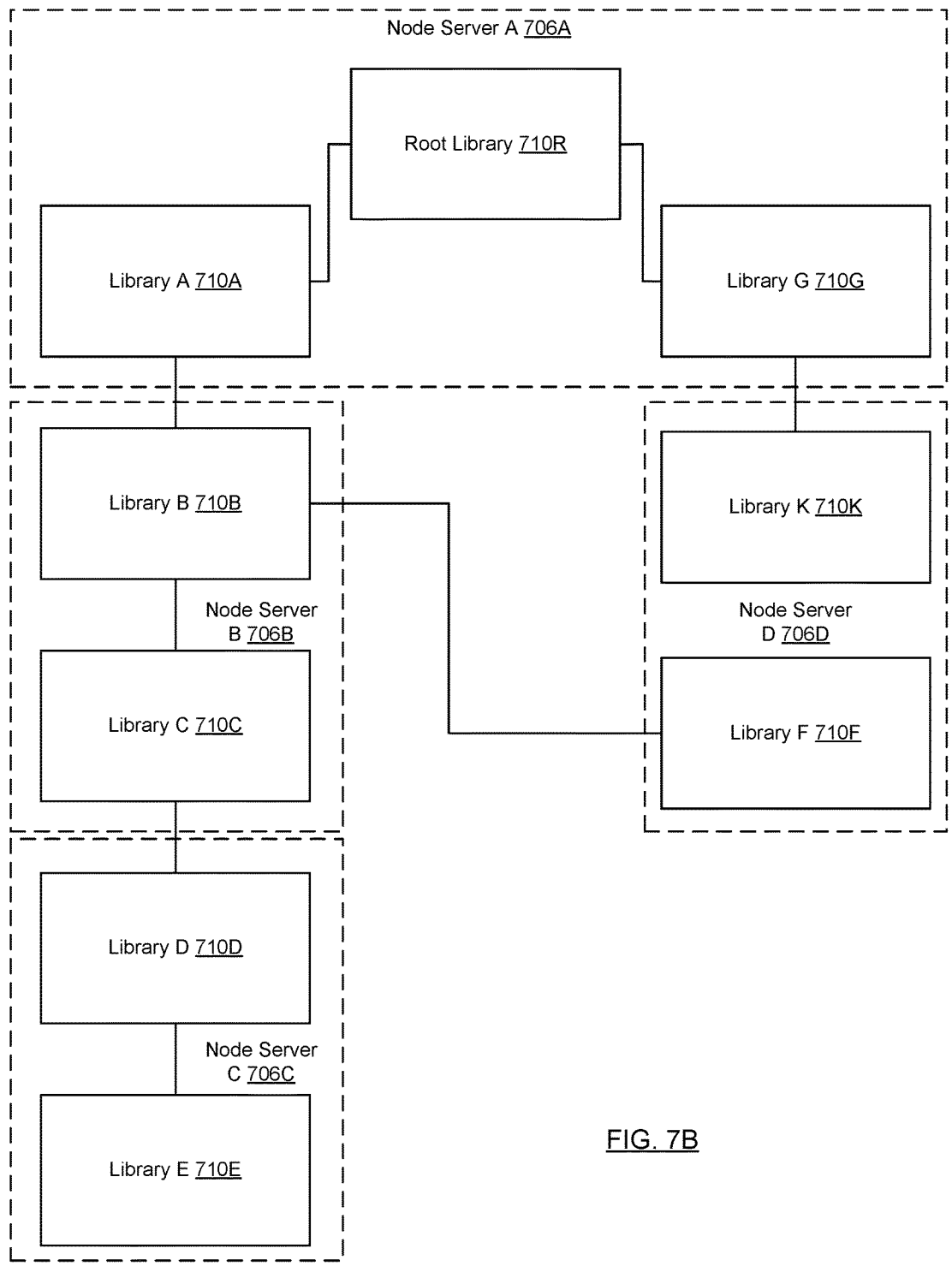
FIG. 7B shows an exemplary library hierarchy in accordance with one or more embodiments of the technology.

Turning to FIGS. 7A-7B, FIGS. 7A and 7B show an exemplary system in accordance with one or more embodiments of the technology. More specifically, FIG. 7A show the location and aforementioned indices within an exemplary system and FIG. 7B shows the hierarchy of the libraries in the exemplary system. The system described in FIGS. 7A-7B is not intended to limit the scope of the technology.

The exemplary system includes a cluster with four node servers (706A, 706B, 706C, 706D) and nine libraries (710R, 710A, 710G, 710B, 710C, 710D, 710E, 710K, 710F). The root library (710R), Library A (710A), and Library G (710G) are bound to node server A (706A). Library B (710B) and Library C (710C) are bound to node server B (706B), Library D (710D) and Library E (710E) are bound to node server C (706C), and Library K (710K) and Library F (710F) are bound to node server D (710D).

Referring to FIG. 7B, the Root Library (710R) has two child libraries, namely, Library A (710A) and Library G (710G). Further, Library A (710A) has one child, Library B (710B), and Library G (710G) has one child library, Library K (710K). In addition, Library B (710B) has two child libraries, Library F (710F) and Library C (710C). Finally, Library C (710C) has one child library, Library D (710D). Library K (710K), Library F (710F), and Library E (710E) do not have any child libraries.

Referring back to FIG. 7A, based on the library hierarchy shown in FIG. 7B, only node server B (706B), node server C (706C), and node server D (706D) include Local Path Indices (LPIs). Specifically, LPI B (708B) on node server B (706B) includes one entry for Library B (710B) and LPI C (708C) on node server C (706C) includes one entry for Library D (710D). Finally, node server D (706D) includes two entries, one for Library K (710K) and one for Library F (710F). The aforementioned entries are included in the respective LPIs because the each corresponds to a library that satisfies the two criteria for LPI entries discussed above.

Further, based on the library hierarchy shown in FIG. 7B, only Library R (710R), Library A (710A), Library G (710G), Library D (710D), Library B (710B), and Library C (710C) include library name indices (712R, 712A, 712G, 712D, 712B, 712C) because they are the only libraries that have child libraries.

Referring to FIG. 7A, the system also includes a client (700), which corresponds to the client shown in FIG. 1A. The client (700) includes a path resolution module (704) and a client cache (702). The path resolution module (704) includes functionality to resolve a library path, e.g., in accordance with the method shown in FIG. 9. The client cache (702) includes functionality to store one or more client cache entries, which may be used by the path resolution module. Additional detail about the client cache entries are described in FIG. 8C.

Figure 8A:
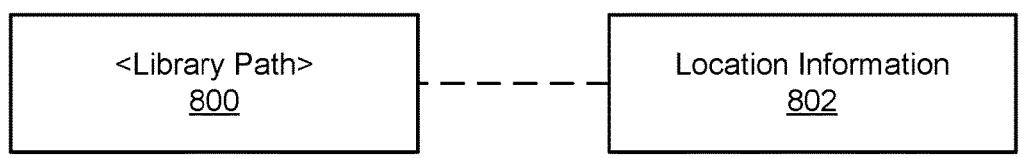
FIG. 8A shows a local path index (LPI) entry in accordance with one or more embodiments of the technology.

FIG. 8A shows a local path index (LPI) entry in accordance with one or more embodiments of the technology. Each LPI entry may include a library path (800) and location information (802). The library path specifies a path from the root library (denoted as "/") to a specific library. For example, referring to FIG. 7B, the library path for Library K is "/G/K". The location information (802) includes information about location of the corresponding library or LNI for the library. The location information may be, for example, a library scope pointer to a library descriptor (not shown in FIG. 7A) that is stored in the library. In one embodiment of the technology, the library descriptor includes metadata associated with the library such as the library name and a library scope pointer to the LNI of the library. Continuing with the above example, referring to FIG. 7A, the location information (802) for the library path "/G/K" may be the library scope pointer to a library descriptor for Library K (not shown) that is stored in Library K. This library descriptor includes a library scope pointer to LNI K (712K). Those skilled in the art will appreciate that the location information may correspond to any information that may be used to directly or indirectly obtain the LNI for the library associated with the library path. Said another way, the location information (802) is not limited to a library scope pointer of the library descriptor.

Figure 8B:
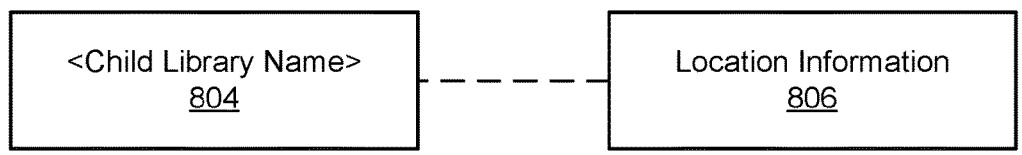
FIG. 8B shows a library name index (LNI) entry in accordance with one or more embodiments of the technology.

FIG. 8B shows a library name index (LNI) entry in accordance with one or more embodiments of the technology. The LNI may include a child library name (or, alternatively, a library path for the child library) (or any other information that may be used to identify the child library) (804) and location information (806). For example, referring to FIG. 7B, the child library for Library G is Library K. Accordingly, LNI G (712G) for Library G (710G) includes an entry for Library K, which may specify "K", "Library K" or "/G/K" for <Child Library Name> (804)). The location information (806) may be, for example, a library scope pointer to a library descriptor (not shown in FIG. 7A) that is stored in the library. Continuing with the above example, the location information (802) for the Library K may be the library scope pointer to a library descriptor for Library K (not shown) that is stored in Library K. This library descriptor includes a library scope pointer to LNI K (712K). Those skilled in the art will appreciate that the location information may correspond to any information that may be used to directly or indirectly obtain the LNI for the library associated with the child library name. Said another way, the location information (806) is not limited to a library scope pointer to a library descriptor.

Figure 8C:
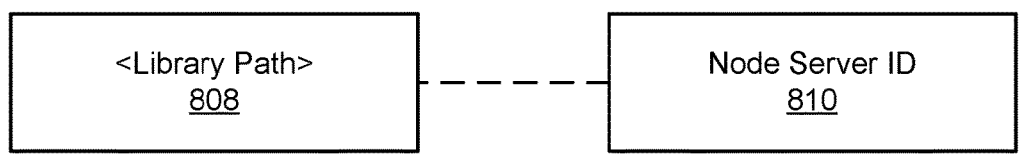
FIG. 8C shows a client cache (CC) entry in accordance with one or more embodiments of the technology.

FIG. 8C shows a client cache (CC) entry in accordance with one or more embodiments of the technology. Each CC entry includes a library path (808) and a node server ID (810). The CC entries are created when there is a successful library path resolution (see FIG. 9, Step 918). For example, referring to FIG. 7B, the library path for Library K is "/G/K". Further, the node server ID (810) uniquely identifies a node server in the cluster through which the library (i.e., the library specified by the library path) is accessible. Continuing with the above example, the node scope ID may be "node server D" when the library path in the client cache entry is "/G/K".

FIG. 9 shows a flowchart for library path resolution in accordance with one or more embodiments of the technology. The method shown in FIG. 9 may be performed by the path resolution module on the client. While the various steps in the flowchart is presented and described sequentially, one of ordinary skill in the art will appreciate that some or all of the steps may be executed in different orders, may be combined or omitted, and some or all of the steps may be executed in parallel. Furthermore, the steps may be performed actively or passively.

In step 900, a request to resolve a library path (also referred to as a path resolution request) is received. The request may include the library path to resolve, e.g., "/A/B/C/D".

In step 902, the path resolution module issues a request to a node server that is bound to the root library. The request may include a cluster scope pointer for the LNI stored in the root library.

In step 904, a determination is made about whether the node server to which the request was made sent a response to the path resolution module. In one embodiment of the technology, the response includes the requested LNI. The LNI may be obtained using the cluster scope pointer as described in FIG. 5. If the node server sent a response to the path resolution module, then the process proceeds to step 906; otherwise, the process proceeds to step 910 or step 914. Additional detail about steps 910 and 914 are provided below.

In step 906, a determination is made about whether the entire path library is resolved. More specifically, the LNI (obtained in response to a request to a node server) is evaluated to determine whether there is an entry for the target library. For example, if the path resolution module is attempting to resolve the following library path "/A/B/C/D", then Library D is the target library and libraries A, B, and C are intermediate libraries. Accordingly, if the LNI includes an entry for Library D, then the entire library path is resolved. If the entire library path is resolved, then the process proceeds to step 918. However, if the LNI does not include an entry for the target library but instead has an entry for an intermediate library, then the process proceeds to step 908.

In step 908, a request is generated and issued to a node server to obtain the LNI for the next library in the path. For example, if the path resolution module is attempting to resolve "/A/B/C/D" and the LNI was obtained from Library A, then the request issued in step 908 is for the LNI of Library B.

As discussed above, in one embodiment of the technology, the LNI includes a library scope pointer for a library descriptor for a Library. Continuing with the above example, the LNI of Library A may include an entry for Library B with a library scope pointer to the library descriptor for Library B. In this scenario, the path resolution module performs the following steps in order to generate the request for the LNI of Library B in step 908: (i) covert the library scope pointer for the library descriptor of Library B to a corresponding cluster scope pointer using a cluster scope ID mapping; (ii) issue a request to a node server with the cluster scope pointer for the library descriptor of Library B; (iii) receive the library descriptor of Library B from the node server; (iv) extract the library scope pointer for the LNI of Library B from the library descriptor obtained in (iv); and (v) covert the library scope pointer for the LNI of Library B to a corresponding cluster scope pointer using a cluster scope ID mapping. The cluster scope pointer obtained in (v) is then included in the request issued in step 908.

The aforementioned process outlined in (i)-(v) above may be repeated each time step 908 is performed.

Returning to step 904, when a request is issued to a node server via any of steps 902, 908 or 912, and the node server does not respond, then the process proceeds to step 910. In step 910, a determination is made about whether there is a client cache entry for a library path that is more specific than the library path associated with the request issued in steps 902, 908, or 910. For example, referring to FIG. 7B, if the path resolution module is trying to resolve the library path "/A/B/C/D" and did not receive a response from node server B for the request for LNI B, then the client cache entries are evaluated to determine whether there is a client cache entry for "A/B/C." If there is a client cache entry for the more specific library path, then the process proceeds to step 912; otherwise, the process proceeds to step 914.

In step 912, a request message is generated with a more specific portion of the library path and is only issued to the node server corresponding to the node server ID specified in the client cache entry. The request message may include the more specific library path. For example, referring to FIG. 7B, if the path resolution module is trying to resolve the library path "/A/B/C/D" and it did not receive a response from node server B for the request for LNI B, then the request message generated and issued in step 912 may be a request message that includes "/A/B/C" and that is only sent to node server B in order to determine if node server B still includes an entry in its LPI for "/A/B/C". If node server B has such an entry in its LPI, node server B responds back to the path resolution module with the location information in the matching entry, which in this example, is the library scope pointer for the library descriptor for Library C.

In step 914, a request message is generated with a more specific portion of the library path and issued (or broadcast) to all node servers. The request message may include the more specific library path. For example, referring to FIG. 7B, if the path resolution module is trying to resolve the library path "/A/B/C/D" and did not receive a response from node server B for the request for LNI B, then the request message generated and issued in step 914 may be a request message that includes "/A/B/C" and that is sent to all node servers in the cluster. Such a request message is broadcast to all node servers in order to determine if any node server includes an entry in its LPI for "/A/B/C". If a node server has such an entry in its LPI, the node server will respond back to the path resolution module with the location information in the matching entry, which in this example, is the library scope pointer to the library descriptor for Library C.

In one embodiment of the invention, the method may proceed from step 910 directly to step 914 in the scenario in which the path resolution module first proceeds through steps 910 and 912, where the node server identified in the client cache entry did not respond to the request message issued in step 912. In such scenarios, step 914 includes generating the request message as described above with respect to step 914; however, the generated request message is sent to all node servers except the node server that was identified in the client cache entry.

For example, if the client cache entry specified node server B and node server B failed to respond to a request message (i.e., a request message issued in step 912), then in step 914 a request message is generated and sent to all node servers in the cluster except node server B.

Continuing with the discussion of FIG. 9, in step 916, a determination is made about whether any of the node servers in the cluster responded to the request message. If a node server responded, the process proceeds to step 906; otherwise, the process may end or proceed to step 910.

The process may proceed to step 910 in scenarios in which a more specific library path may be generated. For example, referring to FIG. 7B, consider a scenario in which the path resolution module is trying to resolve the library path "/A/B/C/D" and the last request message that was sent specified library path "/A/B". If no node server responds to this request message, the path resolution module attempts to send a request message with "A/B/C".

The process may end in scenarios in which no additional request messages with more specific library paths can be generated. For example, referring to FIG. 7B, consider a scenario in which the path resolution module is trying to resolve the library path "/A/B/C/D" and the last request message that was sent specified library path "/A/B/C/D". If no node server responds to this request message, the path resolution module is unable to resolve the library path and the process ends.

Returning to step 906, if the entire library path is resolved, then in step 918, the client cache is updated to include a new client cache entry (or an updated client cache entry) that includes the library path (i.e., the library path from the request in step 900) and the node server ID that is bound to the library that is the target library in the library path.

Example

The following section describes an example for resolving the library path in the exemplary system shown in FIGS. 7A-7B. Consider a scenario in which the path resolution module is attempting to resolve the library path "/A/B/C/D/E", where node server B has failed.

In this scenario, the path resolution module first issues a request to the root library for LNI R to node server A. Node Server A subsequently responds with LNI R. A LNI entry for Library A is located in LNI R, where the LNI entry includes the library scope pointer for the library descriptor for Library A. The library scope pointer for the library descriptor is subsequently converted to a cluster scope pointer. The path resolution module subsequently issues a request for the library descriptor to node server A using the aforementioned cluster scope pointer.

Node server A subsequently responds with a library descriptor for Library A. A library scope pointer for LNI A is subsequently obtained from the library descriptor and converted to a cluster scope pointer. The path resolution module then issues a request for LNI A to node server A using the aforementioned cluster scope pointer.

Node Server A subsequently responds with LNI A. A LNI entry for Library B is located in LNI A, where the LNI entry includes the library scope pointer for the library descriptor for Library B. The library scope pointer for the library descriptor for Library B is subsequently converted to a cluster scope pointer. The path resolution module then issues a request for the library descriptor of Library B to node server B using the aforementioned cluster scope pointer.

Node server B, which has failed, does not respond to the aforementioned request from the path resolution module. The path resolution module subsequently determines that there is no client cache entry for "A/B/C". Based on this determination, the path resolution module generates and issues a request message to all node servers (i.e., node servers A-D) in the cluster, where the request message specifies the library path "/A/B/C". Because Library C is on node server B and node server B has failed, there is no response to the request messages.

The path resolution module subsequently determines that there is no client cache entry for "A/B/C/D". Based on this determination, the path resolution module generates and issues a request message to all node servers (i.e., node servers A-D) in the cluster, where the request message specifies the library path "/A/B/C/D".

When this message is received by node server D, node server D uses the library path in the request message (i.e., "/A/B/C/D") to perform a look-up in its LPI. In this example, node server D has two entries in its LPI. The first entry has a library path "/G/K" and the second entry has a path "/A/B/C/D". Node D subsequently determines that the library path in the second entry matches the library path in the request message. Based on this determination, node server D responds to the request message with the location information associated with the second entry. In this example, the location information is the library scope pointer for the library descriptor for Library D. The library scope pointer for library descriptor is subsequently converted to a cluster scope pointer. The path resolution module subsequently issues a request for the library descriptor to node server D using the aforementioned cluster scope pointer.

Node server D subsequently responds with a library descriptor for Library D. A library scope pointer for LNI D is then obtained from the library descriptor and converted to a cluster scope pointer. The path resolution module then issues a request for LNI D to node server D using the aforementioned cluster scope pointer. Node Server D subsequently responds with LNI D.

Upon receipt of LNI D, the path resolution module looks for an entry for Library E. In this example, LNI D includes an entry for Library E because Library E is a child of Library D. At this stage the entire library path is resolved and a client cache entry is generated. The generated client cache entry specifies library path "/A/B/C/D/E" and node server ID=node server C. The client cache entry is subsequently stored in the client cache.

Embodiments of the technology may be implemented on a computing system. Any combination of mobile, desktop, server, embedded, or other types of hardware may be used. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (1000) may be located at a remote location and connected to the other elements over a network (1014). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for resolving a library path, comprising:
receiving a path resolution request comprising the library path;
issuing a first request to a first node server to obtain a first library name index (LNI) associated with a first portion of the library path, wherein the first node server is one of a plurality of node servers in a cluster;
obtaining in response to the first request, the first LNI;
generating, based on the first LNI, a second request to a second node server of the plurality of node servers, wherein the second request is associated with a second portion of the library path;
after not receiving a second response to the second request:
issuing a request message to a set of the plurality of node servers, wherein issuing the request message comprises:
determining that a client cache entry comprises a third portion of the library path exists, wherein the third portion comprises the second portion of the library path, and the second portion of the library path comprises the first portion of the library path; and
issuing the request message to only a node server of the plurality of node servers specified in the client cache entry;
wherein the set of the plurality of node servers only includes the node server of the plurality of node servers specified in the client cache entry;
receiving, from the node server of the plurality of node servers specified in the client cache entry, a third response to the request message; and
resolving the entire library path using, at least in part, the third response.

2. The method of claim 1, further comprising:
after resolving the entire library path:
storing a second client cache entry comprising the library path and a node server ID, wherein the node server ID identifies a node server of the plurality of node servers upon which a target library identified by the library path is located.

3. The method of claim 2, wherein the library path specifies the target library and all intermediate libraries between a root library and the target library.

4. The method of claim 1, wherein the request message comprises the third portion of the library path.

5. The method of claim 4, wherein the third response to the request is generated when an entry in a local path index (LPI) matches the third portion of the library path.

6. A system, comprising
a computer hardware processor;
a memory, accessible to the computer hardware processor, storing a path resolution module, wherein the module executes on the computer hardware processor and is configured to:
receive a path resolution request comprising a library path;
issue a first request to a first node server to obtain a first library name index (LNI) associated with a first portion of the library path, wherein the first node server is one of a plurality of node servers in a cluster;
obtain in response to the first request, the first LNI;
generate, using the first LNI, a second request to a second node server of the plurality of node servers, wherein the second request is associated with a second portion of the library path;
after not receiving a second response to the second request:
issue a request message to a set of the plurality of node servers;
wherein the memory, accessible to the computer hardware processor, further stores a client cache, wherein issuing the request message comprises:
determining that a client cache entry comprising a third portion of the library path exists, wherein the third portion comprises the second portion of the library path, and the second portion of the library path comprises the first portion of the library path; and
issuing the request message to only a node server of the plurality of node servers specified in the client cache entry, wherein the set of the plurality of node servers only includes the node server of the plurality of node servers specified in the client cache entry;
receive, from the node server of the plurality of node servers specified in the client cache entry, a third response to the request message; and
resolve the entire library path using, at least in part, the third response.

7. The system of claim 6,
wherein the module executes on the computer hardware processor and is further configured to:
after resolving the entire library path:
store, in the client cache, a second client cache entry comprising the library path and a node server ID, wherein the node server ID identifies a node server of the plurality of node servers upon which a target library identified by the library path is located.

8. The system of claim 7, wherein the library path specifies the target library and all intermediate libraries between a root library and the target library.

9. The system of claim 6, wherein the request message comprises a third portion of the library path.

10. The system of claim 9, wherein the third response to the request is generated when an entry in a local path index (LPI) matches the third portion of the library path.

11. A non-transitory computer readable medium comprising computer readable program code, which when executed by a computer processor enables the computer processor to perform a method for servicing requests, the method comprising:

receiving a path resolution request comprising a library path;

issuing a first request to a first node server to obtain a first library name index (LNI) associated with a first portion of the library path, wherein the first node server is one of a plurality of node servers in a cluster;

obtaining in response to the first request, the first LNI;

generating, using the first LNI, a second request to a second node server of the plurality of node servers, wherein the second request is associated with a second portion of the library path;

after not receiving a second response to the second request:

issuing a request message to a set of the plurality of node servers, wherein issuing the request message comprises:

determining that a client cache entry comprising a third portion of the library path exists, wherein the third portion comprises the second portion of the library path, and the second portion of the library path comprises the first portion of the library path; and issuing the request message to only a node server of the plurality of node servers specified in the client cache entry, wherein the set of the plurality of node servers only includes the node server of the plurality of node servers specified in the client cache entry;

receiving, from the node server of the plurality of node servers specified in the client cache entry, a third response to the request message; and resolving the entire library path using, at least in part, the third response.

12. The non-transitory computer readable medium of claim 11, wherein the method further comprises:

after resolving the entire library path:

storing a second client cache entry comprising the library path and a node server ID, wherein the node server ID identifies a node server of the plurality of node servers upon which a target library identified by the library path is located, wherein the library path specifies the target library and all intermediate libraries between a root library and the target library.

\* \* \* \* \*